US007156027B1

(12) United States Patent
Yokoyama et al.

(10) Patent No.: US 7,156,027 B1
(45) Date of Patent: Jan. 2, 2007

(54) METHOD FOR PRODUCING SOIL, SOIL-PROCESSING UNIT, METHOD FOR PROCESSING AND UNIT FOR PROCESSING

(75) Inventors: Yoshiaki Yokoyama, Kounosu (JP); Tooru Kodama, Toyota (JP); Yasuo Mishima, Toyota (JP); Katuo Takamiya, Toyota (JP)

(73) Assignee: Houei Syoukai Co., Ltd., Toyota (JP)

( * ) Notice: Subject to any disclaimer, the term of this patent is extended or adjusted under 35 U.S.C. 154(b) by 0 days.

(21) Appl. No.: 09/676,367

(22) Filed: Sep. 29, 2000

Related U.S. Application Data

(63) Continuation of application No. PCT/JP99/01660, filed on Mar. 31, 1999.

(30) Foreign Application Priority Data

| Mar. 31, 1998 | (JP) | 10-103297 |
| Sep. 28, 1998 | (JP) | 10-273417 |
| Dec. 27, 1998 | (JP) | 10-377175 |

(51) Int. Cl.
F23B 7/00 (2006.01)
F23G 5/12 (2006.01)
C01B 7/00 (2006.01)

(52) U.S. Cl. .............. 110/341; 110/229; 423/240 R; 422/188

(58) Field of Classification Search ............. 110/342, 110/345, 346, 203, 208, 295; 588/209, 228, 588/213, 214; 422/187, 188; 423/240 R
See application file for complete search history.

(56) References Cited

U.S. PATENT DOCUMENTS

| 4,615,283 | A | * | 10/1986 | Ciliberti et al. ............. 110/216 |
| 4,667,609 | A | | 5/1987 | Hardison et al. |
| 4,685,220 | A | * | 8/1987 | Meenan et al. ................. 34/10 |
| 4,700,638 | A | * | 10/1987 | Przewalski ................... 110/346 |
| 4,881,475 | A | * | 11/1989 | De Leur ...................... 110/346 |
| 4,961,391 | A | * | 10/1990 | Mak et al. .................... 110/346 |
| 4,977,839 | A | * | 12/1990 | Fochtman et al. .......... 110/346 |
| 5,020,452 | A | * | 6/1991 | Ryback ....................... 110/241 |
| 5,103,578 | A | * | 4/1992 | Rickard ......................... 34/92 |
| 5,179,903 | A | * | 1/1993 | Abboud et al. ............. 110/345 |
| 5,245,113 | A | * | 9/1993 | Schulz ........................ 588/209 |
| 5,273,629 | A | * | 12/1993 | Meenan et al. ............. 204/131 |
| 5,300,137 | A | * | 4/1994 | Weyand et al. ............... 75/670 |
| 5,405,579 | A | * | 4/1995 | Melzer et al. ................ 422/26 |
| 5,541,386 | A | * | 7/1996 | Alvi et al. ............. 219/121.38 |
| 5,595,483 | A | * | 1/1997 | Melber et al. .............. 432/205 |
| 5,619,936 | A | * | 4/1997 | Veltmann .................... 110/345 |

(Continued)

FOREIGN PATENT DOCUMENTS

DE  196 06 339 A1   8/1996

(Continued)

Primary Examiner—Kenneth Rinehart
(74) Attorney, Agent, or Firm—Oblon, Spivak, McClelland, Maier & Neustadt, P.C.

(57) ABSTRACT

An object to be treated such as soil, burned fly ashes, or the like containing organic halides is introduced to a hermetically sealable thermal decomposition furnace 310 and heated under reduced pressure. Emitted gases of the object to be treated are treated so that the generation and recomposition of dioxins are supressed. A heated residue of the object to be treated is cooled after being purged with a purge gas which is organic halide-free and has no organic halide generating capacity. Thus, the concentration of organic halides remaining in the heated residue can be held to an extremely low level.

14 Claims, 18 Drawing Sheets

U.S. PATENT DOCUMENTS

| | | | |
|---|---|---|---|
| 5,650,127 A * | 7/1997 | Campbell et al. | 423/239.1 |
| 5,662,050 A * | 9/1997 | Angelo et al. | 110/246 |
| 5,678,496 A * | 10/1997 | Buizza et al. | 110/229 |
| 5,720,232 A * | 2/1998 | Meador | 110/346 |
| 5,797,995 A * | 8/1998 | Krabbenhoft et al. | 134/19 |
| 5,836,718 A * | 11/1998 | Price | 405/128 |
| 5,886,326 A * | 3/1999 | Tang | 219/679 |
| 5,890,443 A * | 4/1999 | Taya et al. | 110/346 |
| 6,063,979 A * | 5/2000 | Miyata et al. | 588/205 |
| 6,284,940 B1 * | 9/2001 | Hashimoto et al. | 588/207 |
| 6,324,999 B1 * | 12/2001 | Maejima | 110/225 |

FOREIGN PATENT DOCUMENTS

| | | |
|---|---|---|
| DE | 197 81 654 T1 | 4/1999 |
| JP | 01-310781 | 12/1989 |
| JP | 03-178675 | 8/1991 |
| JP | 05-086478 | 4/1993 |
| JP | 5-208184 | 8/1993 |
| JP | 05-305275 | 11/1993 |
| JP | 05-346219 | 12/1993 |
| JP | 07-112172 | 5/1995 |
| JP | 07-116451 | 5/1995 |
| JP | 07-265833 | 10/1995 |
| JP | 07-313951 | 12/1995 |
| JP | 8-501601 | 2/1996 |
| JP | 08-068528 | 3/1996 |
| JP | 08-108164 | 4/1996 |
| JP | 08-168752 | 7/1996 |
| JP | 08-187483 | 7/1996 |
| JP | 08-290147 | 11/1996 |
| JP | 09-126427 | 5/1997 |
| JP | 09-192641 | 7/1997 |
| JP | 09-248549 | 9/1997 |
| JP | 10-047629 | 2/1998 |
| JP | 10-099815 | 4/1998 |
| JP | 11-019625 | 1/1999 |
| WO | WO 88/00483 | 1/1988 |
| WO | WO 94/06946 | 3/1994 |
| WO | WO 97/33703 | 9/1997 |
| WO | WO 98/05439 | 2/1998 |

* cited by examiner

Fig. 12

| | 600°C THERMAL DECOMPOSITION | 600°C THERMAL DECOMPOSITION* | 800°C THERMAL DECOMPOSITION* | 800°C THERMAL DECOMPOSITION | 800°C THERMAL DECOMPOSITION B* |
|---|---|---|---|---|---|
| | NORMAL PRESSURE | REDUCED PRESSURE | NORMAL PRESSURE | REDUCED PRESSURE | REDUCED PRESSURE |
| PCDFs | 0.05822 | n.d. | 4.75 | n.d. | n.d. |
| PCDDs | 0.62615 | 0.00021 | 19.36 | n.d. | n.d. |
| PCDFs+PCDDs | 0.68437 | 0.00021 | 24.11 | n.d. | n.d. |

UNIT:[ng/g]

METHOD FOR PRODUCING SOIL, SOIL-PROCESSING UNIT, METHOD FOR PROCESSING AND UNIT FOR PROCESSING

CROSS-REFERENCE TO RELATED APPLICATIONS

This application is a continuation of International Patent Application No. PCT/JP99/01660 filed on Mar. 31, 1999 under 35 U.S.C. 365(c).

TECHNICAL FIELD

The present invention relates to a treatment method and a treatment apparatus capable of supressing the generation of dioxins, and particularly relates to a treatment apparatus and a treatment method capable of supressing the generation of organic halides containing dioxins in thermal decomposition treatment of scrapped cars and the like and treatment of refuse and wastes from factories, general households, and the like. Also, it relates to a treatment method and a treatment apparatus capable of reducing the concentration of residual dioxins in a thermally decomposed residue, a burned residue, residual liquid, soil, sludge, and the like which contain noxious organic halides such as dioxins. Moreover, the present invention relates to a method for producing clean soil from soil containing organic halides such as dioxins.

BACKGROUND ART

Recently, with an increase in the production number of automobiles such as passenger cars, buses, trucks, and the like, the number of cars to be scrapped increases drastically, and the quantities of refuse, waste articles such as household appliances or the like from general households, factories, and the like are increasing, and as a result, new pollution caused by the disposal of these materials is indicated. Namely, these scrapped cars, waste articles, refuse, shredders, and the like contain various substances such as iron, nonferrous metals, plastics, or rubbers. When these substances are subjected to thermal decomposition or combustion treatment, noxious organic halides such as NOx, SOx, or dioxins are generated, and they remain in large quantities in a heated residue such as a thermally decomposed residue or a burned residue, or produced gases, produced liquids, and residual liquid which are brought by combustion and thermal decomposition. The dioxins are deadly poison, and recently the harmful influences thereof on the human body are reported almost every day. Actually, organic halides such as dioxins remain in burned fly ashes, a thermally decomposed residue, burned waste gas, residual liquid, and dust, which is a serious social problem.

Accordingly, various studies of inhibition of generation of dioxins and safe and effective treatment of making dioxins innoxious are performed as measures against dioxins. Effective treatment technologies for organic halides containing dioxins, however, have not been established so far.

It is known that when an object to be treated such as burned fly ashes, soil, sludge, agricultural products or aquatic products containing noxious organic halides such as dioxins, PCB, or coplanar PCB, or an object to be treated such as household refuse, shredder dust or circuit boards capable of generating organic halides is heated in a reducing atmosphere, dechlorination reaction is produced, which is effective in reducing the concentration of dioxins. Moreover, it is generally known that dioxins are decomposed by being heated to a temperature not less than about 500° C. in a reducing atmosphere. Hence, if the object to be treated is heated while a reducing atmosphere is maintained within a system, dioxins can be decomposed. In both combustion and thermal decomposition, however, it is inevitable to generate dioxins in the process of heating from normal temperature to about 500° C., and effective measures against dioxins generated in this heating process have not been established yet. Therefore, establishment of effective treatment technologies for dioxins generated in the process in which the object to be treated reaches a predetermined heating temperature is demanded. Furthermore, there is a problem that it is difficult to abruptly raise the temperature in a heating chamber to a predetermined temperature while the degree of vacuum therein is maintained at a predetermined degree of vacuum when roasting treatment (thermal decomposition treatment) of the object to be treated containing organic halides or the object to be treated capable of generating organic halides is performed based on the conventional measures against dioxins as described above.

The diffusion of organic halides such as dioxins, PCB, or coplanar PCB to the environment and their influences are serious social problems. For example, noxious organic halides such as dioxins remain in heated residues (ashes, chars, carbon) resulting from combustion treatment and thermal decomposition treatment of wastes. Moreover, a high concentration of dioxins are detected from soil and the like around a refuse incineration plant and an industrial waste disposal plant, for example, and thus a harmful influence on residents' health causes serious anxiety. Furthermore, soil, sludge, and the like also contain organic halides.

As described above, organic halides such as dioxins, or heavy metals remain in many cases in solids and liquids such as the heated residue of wastes, soil and sludge under special conditions, or the like.

As a method for removing noxious substances containing organic halides or heavy metals, a method of reducing the concentration of organic halides by heating an object to be treated containing organic halides at a high temperature or by subjecting it to melting treatment at a temperature as high as about 1500° C. is proposed. Such a method, however, has disadvantages that expensive and large-scale equipment is needed, running costs are high, and the like. Moreover, this method has a disadvantage of being unable to cope with dioxins generated while the temperature of the object to be treated reaches the decomposition temperature of dioxins from normal temperature. Effective treatment technology for soil around incineration facilities and the like to which organic halides such as dioxins, As, Hg, Cd, Pb, $Cr^{+6}$ and the like fall, has not been established.

When town refuse and the like are treated by combustion (incineration), the generation of organic halides can be reduced if they can be burned completely. It is extremely difficult, however, to completely burn abundant and heterogeneous objects to be treated. Even if complete combusting is possible, noxious organic halides such as dioxins are generated until the object to be treated reaches a predetermined temperature.

Organic halides such as dioxins remain in a heated residue being a residue behind heat treatment of the object to be treated such as incineration or thermal decomposition, and the establishment of heat treatment technology for reducing the concentration of organic halides remaining in the heated residue and removing them is demanded.

Incidentally, to generate dioxins, it is necessary that reactive chlorine atoms bonding with carbon of a benzene nucleus and oxygen for bonding a benzene nucleus exist (See FIG. 6). FIG. 6 is the flow of chemical reaction during incineration presumed by Choudhry et al in the United States of America. It is thought that it is effective to control the quantities of these reactive chlorine atoms and oxygen in a thermal decomposition furnace in order to inhibit dioxins from being generated at the time of thermal decomposition. However, hitherto a thermal decomposition furnace suitable for preventing the generation of dioxins from such a viewpoint has not been proposed. Especially, technology for realizing the inhibition of generation of organic halides such as dioxins or coplanar PCB at relatively low temperatures (from normal temperature to 500° C.) in the process of temperature rise to a predetermined heating temperature and the decomposition of organic halides remaining in a heated residue such as residual ashes or the like at a low temperature has not been established yet.

DISCLOSURE OF THE INVENTION

The present invention is made to solve the aforethe problems. An object of the present invention is to provide a soil producing method and a soil processing apparatus for producing clean soil from soil contaminated by organic halides such as dioxins or the like.

Another object of the present invention is to provide a processing method and a processing apparatus for safely treating an object to be treated such as burned ashes or shredder dust.

A problem to be solved of the present invention is to prevent the generation of dioxins to the utmost and keep the concentration of dioxins remaining in a heated residue low by a way of changing the pressure and temperature in a heating chamber in heat-treating an object to be treated.

Another problem of the present invention is to provide a processing method and a processing apparatus capable of safely and certainly removing dioxins contained in a heated residue such as residual ashes, residual liquid, and soot and dust let out from refuse incineration facilities of local governments, factories, and the like, and soil, sludge, and the like contaminated by dioxins.

Still another problem of the present invention is to provide a thermal decomposition method and apparatus capable of preventing the generation of dioxins itself by controlling the temperature, pressure, quantities of chlorine and oxygen in a furnace depending on the temperature, pressure, quantities of chlorine and oxygen therein at the time of thermal decomposition, certainly decomposing and removing residual dioxins even when dioxins are generated or residual dioxins exist, and effectively treating dioxins even in thermal decomposition at a relatively low temperature under normal pressure.

In order to solve these problems, the present invention adopts the following structure.

A soil producing method of the present invention is characterized in that a soil producing method for producing second soil containing organic halides with a second concentration lower than a first concentration from first soil containing the organic halides with the first concentration comprises the steps of: introducing the first soil to a hermetic zone; and thermally decomposing at least a part of the organic halides by heating the first soil under reduced pressure. An object is heated to a temperature not less than the decomposition temperature of the organic halides, or a temperature not less than a boiling point.

As examples of organic halides, dioxins, PCB, and coplanar PCB, and the like are given.

The method may further comprise the step of reducing the concentration of halogen contained in gases produced by the thermal decomposition of the soil. Thereby, a possibility of generation or regeneration of organic halides in the produced gases can be reduced.

A thermally decomposed residue of the first soil may be cooled after the hermetic zone is purged by a purge gas which is substantially organic halide-free and not capable of generating organic halides. As a result, organic halides such as dioxins can be prevented from being fixed in the residue by cooling.

As configurations of the purge gas which is substantially organic halide-free and not capable of generating organic halides, at least one element of gases selected from a group consisting of helium, neon, argon, krypton, xenon, nitrogen, and hydrogen, a mixed gas of these gases, a gas with these gases and the mixed gas as a main constituent, for example, can be given.

The thermally decomposing step may be performed in the hermetic zone where an oxygen concentration is controlled. Consequently, a change in the amount of produced gases can be controlled, irrespective of heterogeneity of the object to be treated, partial combustion, and the like, and thus the produced gases can be treated more surely and efficiently. Moreover, the generation of dioxins can be prevented by supressing the concentration of oxygen and the concentration of halogen.

A soil producing method of the present invention is characterized in that a soil producing method for producing second soil containing organic halides with a second concentration lower than a first concentration from first soil containing the organic halides with the first concentration comprises the steps of: heating the first soil so that at least a part of the organic halides are evaporated or decomposed; introducing a heated residue of the soil to a hermetic zone; and cooling the heated residue of the soil after the hermetic zone is purged by a purge gas which is substantially organic halide-free and not capable of generating organic halides.

Furthermore, a soil producing method of the present invention is characterized in that soil containing organic halides is thermally decomposed under reduced pressure. Under reduced pressure, a mean free path of a molecule is long, and a non-oxidizing atmosphere is maintained in the furnace, thereby preventing the generation and regeneration of organic halides such as dioxins. Moreover, under reduced pressure, the partial pressure of organic halides themselves is low, thereby making it possible to reduce the concentration of dioxins remaining in the heated residue.

Dioxins can be treated effectively by heat-treating soil, a heated residue, roasted articles, residual ashes, residual liquid, soot and dust, and the like containing residual dioxins, for example, from refuse disposal facilities, factories, and the like while the pressure is reduced from normal pressure with an increase in temperature.

Besides, the concentration of halogen contained in gases produced by the thermal decomposition of soil may be reduced.

A soil treatment apparatus of the present invention is characterized in that a soil treatment apparatus for treating soil containing organic halides or being capable of generating organic halides by heating comprises: means for heating the soil; a hermetic zone; means for introducing a heated residue of the soil to the hermetic zone; means for purging the hermetic zone by a purge gas which is substantially organic halide-free (which is short of organic halides); and means for cooling the heated residue.

In the present invention, regardless of combustion, thermal decomposition, or thermal decomposition under reduced pressure, after being heated, soil being the object is purged and cooled in the hermetic zone. The purging means may introduce the purge gas after the pressure in the hermetic zone is reduced.

Moreover, the apparatus may further comprise halogen trapping means having a metal for forming chemical compounds with halogen contained in gases produced by the heating of the soil or an adsorbent for adsorbing the halogen in the gases.

Besides, the apparatus may further comprises: reforming means for reforming gases produced by the heating of the soil at a first temperature at which dioxins are decomposed; and cooling means for cooling the produced gases to a second temperature so that an increase in the concentration of dioxins in the gases is supressed. As concerns the cooling means, rapid cooling by jetting oil to the produced gases is also recommended.

Namely, a treatment method of the present invention is characterized in that an object to be treated containing organic halides is thermally decomposed under reduced pressure.

Further, a treatment apparatus of the present invention is characterized in that a treatment apparatus for treating an object to be treated containing organic halides or being capable of generating organic halides by heating comprises: means for heating the object; a hermetic zone; means for introducing the heated residue to the hermetic zone; means for purging the hermetic zone by a purge gas which is substantially organic halide-free (which is short of organic halides); and means for cooling the heated residue.

As the heating means, a combustion furnace for combusting the object, a thermal decomposition furnace for thermally decomposing the object, a reduced pressure thermal decomposition furnace for thermally decomposing the object under reduced pressure can be named.

A treatment apparatus of the present invention is characterized in that an object to be treated is passed through a furnace allowing the control of thermal decomposition temperature or through a plurality of reduced pressure furnaces different in thermal decomposition temperature when being subjected to thermal decomposition (roasting) treatment while the pressure is being reduced from normal pressure. For example, the object to be treated may be thermally decomposed while the pressure in the furnace is maintained almost constant and the temperature therein is changed.

Further, it is characterized in that a furnace allowing the control of thermal decomposition temperature at which an object to be treated is subjected to thermal decomposition treatment is provided, the pressure in the furnace is changed from normal pressure to a predetermined degree of vacuum, and thus the degree of vacuum is allowed to be maintained. For example, the object to be treated may be thermally decomposed while the temperature in the furnace is maintained almost constant and the pressure therein is changed.

Furthermore, a normal pressure furnace and a plurality of reduced pressure furnaces each for subjecting an object to be treated to thermal decomposition treatment may be continuously provided, and the thermal decomposition temperature in each of the furnaces may be set so as to increase with progress to a later stage.

It is characterized by further comprising halogen trapping means placed to connect with the reduced pressure furnaces and holding metal for forming compounds with halogen contained in gases produced by the thermal decomposition of the object to be treated or an adsorbent for adsorbing the halogen in the gases therein. A portion of the halogen trapping means loaded, for example, with metals for trapping halogen, a catalyst for decomposing the halogen, or the like may be maintained at a constant temperature in the range of normal temperature to about 1000° C., and more preferably in the range of about 400° C. to about 1000° C. It is desirable to maintain a portion, at which halogen is adsorbed, at a low temperature.

In the present invention, a heated residue containing residual dioxins generated from waste disposal facilities, factories, and the like may be treated while being heated with a reduction in pressure. Roasted articles, residual ashes, residual liquid, soot and dust, and the like which contain residual dioxins let out from refuse disposal facilities, factories, and the like may be treated while the pressure is reduced from normal pressure with an increase in temperature.

In the present invention, it is suitable that by introducing produced gases into reducing means in a heating state placed at a gas outlet of a hermetically sealable thermal decomposition furnace, the produced gases are decomposed and reduced, then the concentration of at least one gas of oxygen, oxide gas, chlorine, chloride gas downstream of the reducing means is measured, and that the temperature, pressure, oxygen concentration, and the like in the thermal decomposition furnace is controlled according to the measured value.

Further, it is suitable that by introducing produced gases into reducing means in a heating state placed at a gas outlet of a hermetically sealable thermal decomposition furnace, the produced gases are decomposed and reduced, then the concentration of at least one gas of oxygen, oxide gas, chlorine, chloride gas in the thermal decomposition furnace or downstream of the reducing means is measured, and that a metal reducing agent is supplied into the thermal decomposition furnace according to the measured value.

Furthermore, in a treatment apparatus of the present invention, it is suitable that a reducing retort capable of temperature rise is provided at a gas outlet of a hermetically sealable thermal decomposition furnace, means for measuring the concentrations of at least either of oxygen or oxide gas and at least either of chlorine or chloride gas is placed downstream of the reducing retort, and that temperature control in the furnace is performed based on the measured values by the aforethe gas concentration measuring means.

Moreover, it is suitable that a reducing retort capable of temperature rise is provided at a gas outlet of a hermetically sealable thermal decomposition furnace, means for measuring the concentrations of at least either of oxygen or oxide gas and at least either of chlorine or chloride gas is placed downstream of the reducing retort, and metal reducing agent supply means for supplying a metal reducing agent such as aluminum or magnesium into the furnace based on the measured values by the aforethe gas concentration measuring means is provided, and that thereby the quantities of oxygen and chlorine in the furnace, and the pressure and temperature in the furnace are controlled.

For example, the oxygen concentration and chlorine concentration in the thermal decomposition furnace, and the temperature and pressure in the furnace, and the like may be controlled by measuring the gas concentrations of at least either of oxygen or oxide gas and at least either of chlorine or chloride gas in the thermal decomposition furnace or downstream of the reducing means and supplying a metal reducing agent such as aluminum or magnesium into the thermal decomposition furnace based on the measured values.

In addition, thermal decomposition under reduced pressure may be performed by providing pressure reducing means in the thermal decomposition furnace. In this case, when an object to be treated containing moisture such as household refuse or shredder dust is thermally decomposed under reduced pressure, it is desirable to use a liquid sealing pump such as a water sealing pump as an exhaust system. A sealing liquid for the liquid sealing pump is not limited to water, and an organic solvent may be used.

Usually, the aforethe thermal decomposition apparatus includes a metal recovery device by condensation and a fine particle removing device. The fine particle removing device is composed of a metal fine particle filter and an oil film fine particle trap for dissolving and capturing fine particles such as dioxins by letting produced gases through an oil film of cloth immersed in oil.

In the present invention, a continuous thermal decomposition apparatus, in which the aforethe thermal decomposition furnaces are continuously arranged in plurality, separating chambers capable of gas separation and pressure equalization between the adjacent thermal decomposition furnaces and temporal storage of the object to be treated are placed between the thermal decomposition furnaces, and which purge chambers as pre-chambers and cooling chambers as post-chambers are provided, may be provided.

Moreover, a metal reducing agent and/or hydroxides of alkali metals and hydroxides of alkali-earth metals may be added into the reducing means. Gases produced by thermal decomposition may be treated through the steps of: recovering evaporated metals by condensation; removing fine particles by an oil tank with an oil film; producing salt by contact with an alkali solution; and removing salt by an ion-exchange resin membrane.

In the present invention, organic halides are defined as what contains dioxins, PCB, coplanar PCB, DDT, trichloroethylene, trihalomethane, and the like (See FIG. 6).

In the present invention, unless not explained specially, polychlorinated dibenzo-p-dioxins (PCDDs), polychlorinated dibenzofurans (PCDFs), and homologues different from these in number of chlorine and substitution position are generically called dioxins. In addition, compounds in which another halogen such as fluorine or bromine is substituted for chlorine in dioxins are included in organic halides defined in the present invention.

To reduce the concentration organic halides such as dioxins, PCB, or coplanar PCB in the heated reside of the object to be treated, it is important to heat the object to be treated at such a temperature that at least part of such organic halides are decomposed and to cool the object to be treated in an atmosphere with the lowest possible concentration of substances having organic halides and organic halide generating capacity.

Meanwhile, also as concerns gases produced by heating of the object to be treated, it is desirable to reduce the concentration of dioxins, for example, the concentration of substances such as halogen capable of generating dioxins as much as possible.

If organic halides coexist in a cooling atmosphere when the object to be treated is cooled, the organic halides are fixed in the object to be treated. If materials capable of generating organic halides coexist when the object to be treated is cooled, organic halides are composed or recomposed in the process of cooling, and consequently organic halides remain in residues as well.

Accordingly, in the present invention, in treating the object to be treated containing organic halides or generating organic halides by heating, after heating such as combustion or thermal decomposition, the heated residues are cooled while the concentration of substances having organic halides and organic halide generating capacity is reduced. For this purpose, the heated residue may be cooled, for example, in an atmosphere purged with a cooling gas containing no material for organic halides. Therefore, it is desirable to use gas containing no halogen, oxygen nor organic compounds as a cooling gas, and, for example, rare gases such as argon, nitrogen, and the like can be used.

As examples of an object to be treated, town refuse, burned ashes of town refuse, soil, sludge, agricultural products, aquatic products, shredder dust, scrapped household appliances, various kinds of wastes, and the like, which are contaminated by organic halides such as dioxins or PCB, can be given.

A treatment method of the present invention is characterized in that a treatment method for treating an object to be treated capable of generating organic halides by heating comprises the steps of: heating the object to be treated; introducing the heated residue to a hermetic zone; purging a purge gas, which is substantially organic halide-free and having not organic halide generating capacity, for gas in the hermetic zone; and cooling the heated residue.

Moreover, a treatment method of the present invention is characterized in that a treatment method for treating an object to be treated capable of generating organic halides by heating comprises the steps of: heating the object to be treated; introducing the heated residue to a hermetic zone; purging a purge gas, which is substantially organic halide-free (which is short of organic halides), for gas in the hermetic zone; and cooling the heated residue, where "organic halide-free" means a shortage of organic halides. As types of a purge gas, a rare gas, nitrogen, hydrogen, or a mixed gas of these gases can be shown. Air also can be used as a purge gas as far as oxygen concentration does not matter.

As types of heating of the object to be treated, for example, combustion, thermal decomposition, and the like can be given. Such heating may be performed while oxygen concentration is controlled. Thermal decomposition may be performed while the pressure in the hermetic zone is controlled, for example, the pressure is reduced or applied.

The purge gas may be introduced into the hermetic zone after the pressure in the hermetic zone is reduced.

Also for gases produced by the heating of the object to be treated, treatment of reducing the concentration of organic halides such as dioxins is performed.

As an example of such treatment, the produced gases may be reformed at a first temperature at which dioxins are decomposed, and the produced gases may be cooled to a second temperature so that an increase in the concentration of dioxins in the reformed produced gases is supressed.

Concerning cooling of the gases produced by the heating of the object to be treated, rapid cooling by jetting oil to the produced gases is also suitable, thereby making it possible to inhibit organic halides from being recomposed, and to trap hydrocarbon and the like in the reformed produced gases.

Moreover, it is also suitable that the produced gases cooled by jetting oil are reheated to a high temperature at which organic halides such as dioxins are decomposed again, and thereafter rapidly cooled by jetting cooling water.

The cooling water may be alkaline.

Further, the concentration of halogen such as chlorine contained in gases produced by the heating of the object to be treated may be reduced. For example, a halogen removing device for removing halogen in the produced gases may be placed at a stage next to a thermal decomposition furnace. As an example of the configuration of a halogen removing device, a configuration in which metals such as iron, cutting scrap, and/or compounds such as calcium hydroxides or the like which react with chlorine contained in the produced gases to compose a chloride are put into a chamber is given. A catalyst and the like for promoting fixing reaction of halogen contained in the produced gases and decomposition of organic halides in the produced gases may be put into the chamber. In addition, an adsorbent for adsorbing halogen contained in the produced gases may be put thereinto. A plurality of structure of halogen removing devices described above may be combined.

When an adsorbent such as zeolite is used for removing halogen, it is desirable to maintain the adsorbent at the lowest possible temperature in order to raise adsorptive efficiency. In this case, the produced gases are cooled in the chamber into which the adsorbent is put, and it is desirable to perform this cooling rapidly so that the residence time of the temperature of the produced gases in the range of production temperatures at which organic halides such as dioxins are reproduced is shortened as much as possible.

Various kinds of treatments for reducing the concentration of organic halides such as dioxins contained in the produced gases described above may be used in combination.

It is recommended that a treatment apparatus of the present invention for carrying out such treatments be provided with, for example, a hermetic zone capable of holding an object to be treated hermetically therein, means for regulating the temperature of the hermetic zone, purging means for replacing gas in the hermetic zone, and cooling means for cooling the heated residue of the object to be treated. In addition, the pressure in the hermetic zone may be reduced.

The purging means may not only replace gas in the hermetic zone, but also introduce a purge gas after reducing the pressure in the hermetic zone and exhausting the gas therein. This exhaust system can be used also for pressure reduction in the hermetic zone other than gas substitution.

Further, moving means for moving the object to be treated in the hermetic zone may be provided. As the moving means, a rotary kiln, a screw conveyor, a tray pusher, a drawer, a roller house, or the like may be provided.

A gas circulating device for circulating gas in the hermetic zone while regulating the temperature of the gas may be provided. As an example of the gas circulating device, it is desirable that a bypass connected to a hermetic zone (a chamber) is provided, and that a circulating pump, a temperature regulating device or a heat exchanger, filter means for removing dust, mist, and the like contained in gas flow, and the like are provided in the bypass. They may be positioned in the order of the filter, the temperature regulating device, and the circulating pump. It is specially desirable to position the filter in a stage prior to the circulating pump and the temperature regulating device. An oil film, for example, may be used as a filter.

The aforethe treatment methods and treatment apparatus are not limited to a reduced pressure thermal decomposition furnace, and can be also applied to treatment in heating furnaces such as an incinerator and a normal pressure thermal decomposition furnace.

For example, a treatment apparatus of the present invention can be added in a stage subsequent to conventional incinerator and normal pressure decomposition furnace. Thus, organic halides such as dioxins and the like can be safely and effectively removed from a burned residue generated in the incinerator in large quantities.

The diffusion of organic halides having toxicity to the environment is a serious problem, and the reconstruction of incineration facilities into new treatment facilities requires tremendous cost and time, and moreover the treatment of wastes generated day by day is also needed. The present invention can be applied also to existing incineration facilities as an incidental equipment. Consequently, it is possible to treat an object to be treated having an organic halide generating capacity while utilizing the existing facilities.

A soil producing method of the present invention is characterized in that a soil producing method for producing second soil containing organic halides with a second concentration lower than a first concentration from first soil containing the organic halides with the first concentration comprises the steps of: introducing the first soil to a hermetic zone; and thermally decomposing at least part of the organic halides by heating the first soil under reduced pressure.

It is desirable that a thermally decomposed residue of the first soil is cooled after a purge gas, substantially being organic halide-free and having no organic halide generating capacity, is substituted for gas in the hermetic zone.

This is because if organic halides coexist in a cooling atmosphere when the object to be treated is cooled, the organic halides are fixed in the heated residue of the object to be treated as described above. In order to evaporate organic halides by heating or remove organic halides from the heated residue of the object to be treated generating organic halides, it is important to replace heating atmosphere gas containing organic halides or to cool the heated residue while reducing the concentration of substances having organic halides and organic halide generating capacity by pressure reduction or the like. As a result, the concentration of organic halides remaining in the second soil being the heated residue of the first soil can be reduced and the organic halides can be removed by cooling the thermally decomposed residue of the first soil while the concentration of organic halides or the substances having organic halide generating capacity is reduced.

Incidentally, it is preferable to perform the thermal decomposition of the first soil while the oxygen concentration in the hermetic zone is controlled. For example, it is recommended to measure the oxygen concentration in the hermetic zone and regulate the oxygen concentration in the hermetic zone according to the measured oxygen concentration. Besides, the aforethe control of oxygen concentration may be performed by introducing a reducing carrier gas or a reducing agent into the hermetic zone.

The aforethe active control of oxygen concentration in the hermetic zone enables thermal decomposition in a stable state even when the object to be treated is heterogeneous. Further, by performing the thermal decomposition while a reducing atmosphere is maintained in the hermetic zone, the generation of organic halides such as dioxins can be supressed. Furthermore, a reduction in pressure in the hermetic zone enables mean free paths of molecules to become longer and the probability of generation of organic halides such as dioxins to be reduced.

When the aforethe first soil contains metals such as heavy metals, the metals may be evaporated by heating the soil and reducing the pressure to thereby be recovered. Thus, even when soil is contaminated by mercury, cadmium, zinc, lead, arsenic, or the like, such metals can be separated from the soil and recovered. Hexavalent chromium, for example, can be reduced into trivalent chromium.

Not limited to treatment of contaminated soil, the present invention can be applied to treatment of burned ashes, sludge, waste water, agricultural products, aquatic products, and the like. Soil treated by the present invention contains a large amount of inorganic components such as porous carbon, and hence can be used not only as soil, but also as an effective soil conditioner. Furthermore, it may be used being mixed with organic substances such as leaf mold and compost.

A treatment method of the present invention is characterized in that in cooling a heated residue of an object to be treated capable of generating dioxins by heating, the heated residue is cooled while the concentration of dioxins in an atmosphere is reduced.

Moreover, it is desirable to reduce not only the concentration of dioxins themselves in a cooling atmosphere, but also the concentrations of substances being raw materials of dioxins (for example, the concentrations of chlorine, oxygen, organic substances, and the like) or the concentration and quantity of such a catalytic substance as promotes the generation reaction of dioxins.

It is recommended that a treatment apparatus of the present invention be provided with: a hermetic zone capable of holding an object to be treated hermetically therein; means for regulating the temperature of the hermetic zone; purging means for replacing gas in the hermetic zone; and cooling means for cooling a heated residue of the object to be treated.

The purging means may not only replace the gas in the hermetic zone, but also introduce a purge gas after reducing the pressure in the hermetic zone and exhausting the gas therein. This exhaust system can be used also for pressure reduction in hermetic zone other than gas substitution.

Further, moving means for moving the object to be treated in the hermetic zone may be provided. As the moving means, a rotary kiln, a screw conveyor, a tray pusher, a drawer, a roller house, or the like may be provided.

A gas circulating device for circulating gas in the hermetic zone while regulating the temperature of the gas may be provided. As an example of the gas circulating device, it is desirable that a bypass communicating with the hermetic zone (a chamber) is provided, and that a circulating pump, a temperature regulating device or a heat exchanger, filter means for removing dust, mist, and the like contained in gas flow are provided in the bypass. They may be positioned in the order of the filter, the temperature regulating device, and the circulating pump. It is specially desirable to position the filter in a stage prior to the circulating pump and the temperature regulating device. An oil film, for example, may be used as a filter.

A treatment apparatus of the present invention may include: a decomposing, reacting, and removing device, connected to the hermetic zone, for decomposing, reacting, and removing gases produced from the object to be treated; an alkaline water (oil) gas injector type (venturi) cooling device communicating with the decomposing, reacting and removing device, for rapidly cooling gas let from the decomposing, reacting, and removing device and reacting the gas with alkali; and a circulating device communicating with the cooling device, for making a cooling medium (water, oil) to be used in the cooling device alkaline. The circulating device may include a filter for removing dust in alkaline water.

Moreover, the treatment apparatus of the present invention may include: a removing device connected to the cooling device, for removing moisture from gas containing moisture let from the cooling device; an adsorption device connected to the removing device, for adsorbing toxic components in the gas from which moisture has been removed; and a suction device for sucking (exhausting) gas let from the adsorption device.

A treatment of the present invention is characterized by comprising: a gas decomposing device for thermally decomposing gas generated from the object to be treated; a vacuum door adjacent to the gas decomposing device and blocking a furnace; a condensing device adjacent to the vacuum door, for recovering evaporated substances; a dust removing device adjacent to the condensing device, for removing dust; a vacuum valve adjacent to the dust removing device, for cutting off condensates from a furnace body and recovering them; and pressure regulating means adjacent to the vacuum valve, for regulating (reducing, applying) the pressure in a hermetic zone.

The treatment device may further comprise: a gas separating device for thermally decomposing gas exhausted by pressure reducing means such as an exhaust system included by the pressure reducing means; an alkaline water (oil) gas injector type (venturi) cooling device for rapidly cooling the decomposed gas and reacting it with alkali; an adsorption device continuous with the cooling device, for adsorbing toxic components in the gas from which moisture has been removed; and a suction device for sucking (exhausting) gas let from the adsorption device.

In a continuous treatment apparatus of the present invention, at least two gastight chambers divided from a hermetic zone by a vacuum door are provided on the inlet side of the hermetic zone, and a pressure reducing device for reducing the pressure in at least one of the two gastight chambers is provided. The two gastight chambers are also divided by a vacuum door. A tray (a jig) for storing an object to be treated is provided in the gastight chamber.

The continuous treatment apparatus comprises: a moving device for moving the tray back and forth between the two gastight chambers; a throwing device for throwing the object to be treated stored in the tray from the gastight chamber adjacent to the hermetic zone into the hermetic zone; and transfer means for transferring the object to be treated thrown into the hermetic zone to the outlet side of the hermetic zone while heating it. The object to be treated is let out from the hermetic zone after being cooled and purged by air and the like.

Provided at the outlet of the gastight chamber for objects to be treated are four chambers: a storing chamber capable of storing a heated residue gastightly; a cooling chamber for cooling the heated residue; a purge chamber for replacing atmosphere with a purge gas or by an exhaust system and storing the vacant tray; and a discharge chamber for discharging the heated residue under normal pressure. These four chambers may include vacuum doors respectively so as to be maintained gastight. Since the throwing chamber can be maintained under normal pressure, three chambers may be maintained gastight. The heated residue is transferred by moving the jig such as the tray between these four chambers. To facilitate the moving, these chambers may be provided in the form of a grid (Each chamber is provided at each vertex of a quadrangle, for example). The transfer of the heated residue from the gastight container for performing heat treatment to the storing chamber is performed by various transfer means, and in addition may be performed by providing the storing chamber below the gastight container and dropping the heated residue by gravity.

BRIEF DESCRIPTION OF DRAWINGS

FIG. 12 is a chart showing measurement results of the concentration of residual dioxins in a heated residue;

BEST MODE FOR CARRYING OUT THE INVENTION

Embodiment 1

Figure 1:
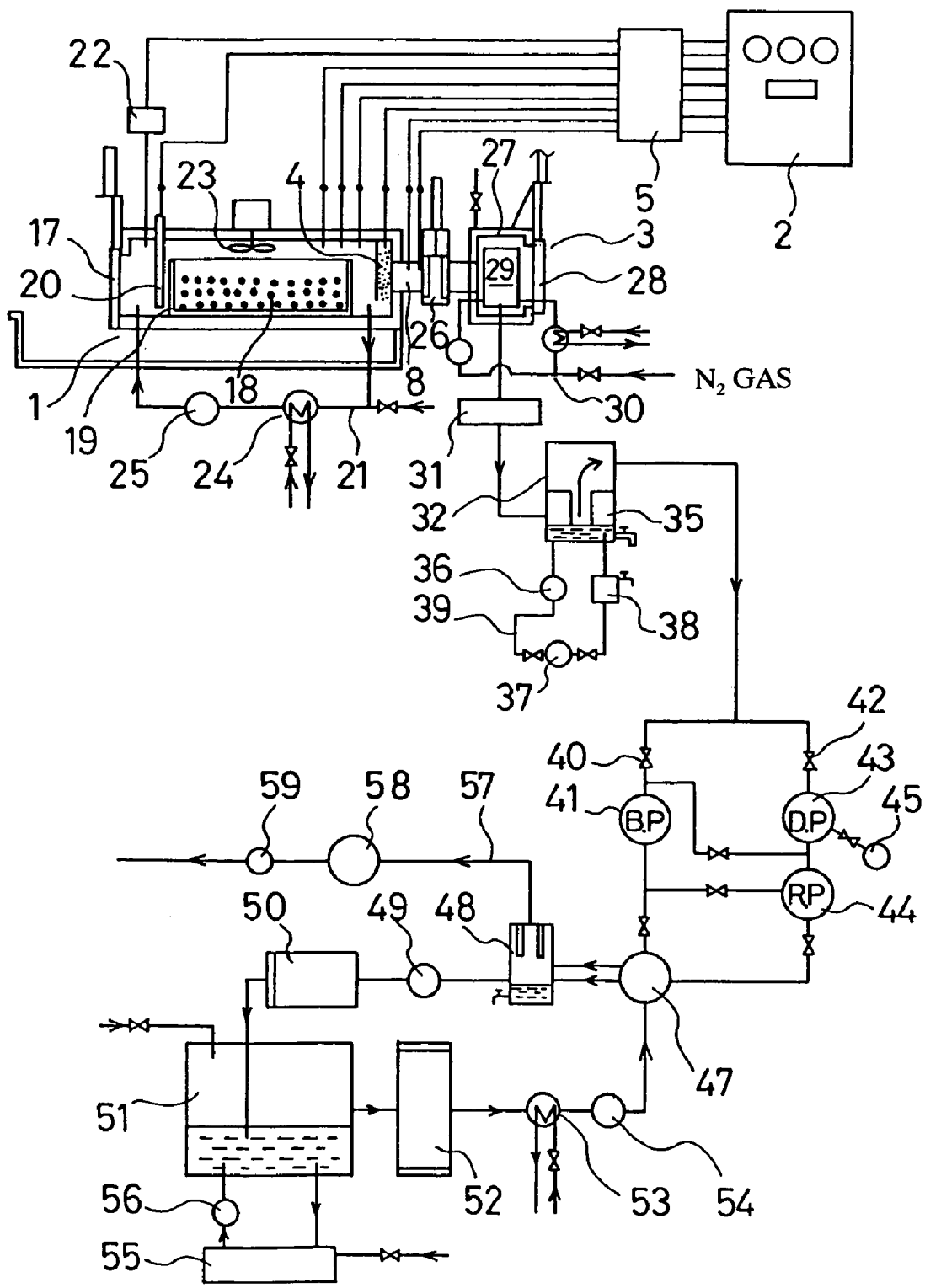
FIG. 1 is an entire structural diagram of an embodiment of the present invention.
Figure 2:
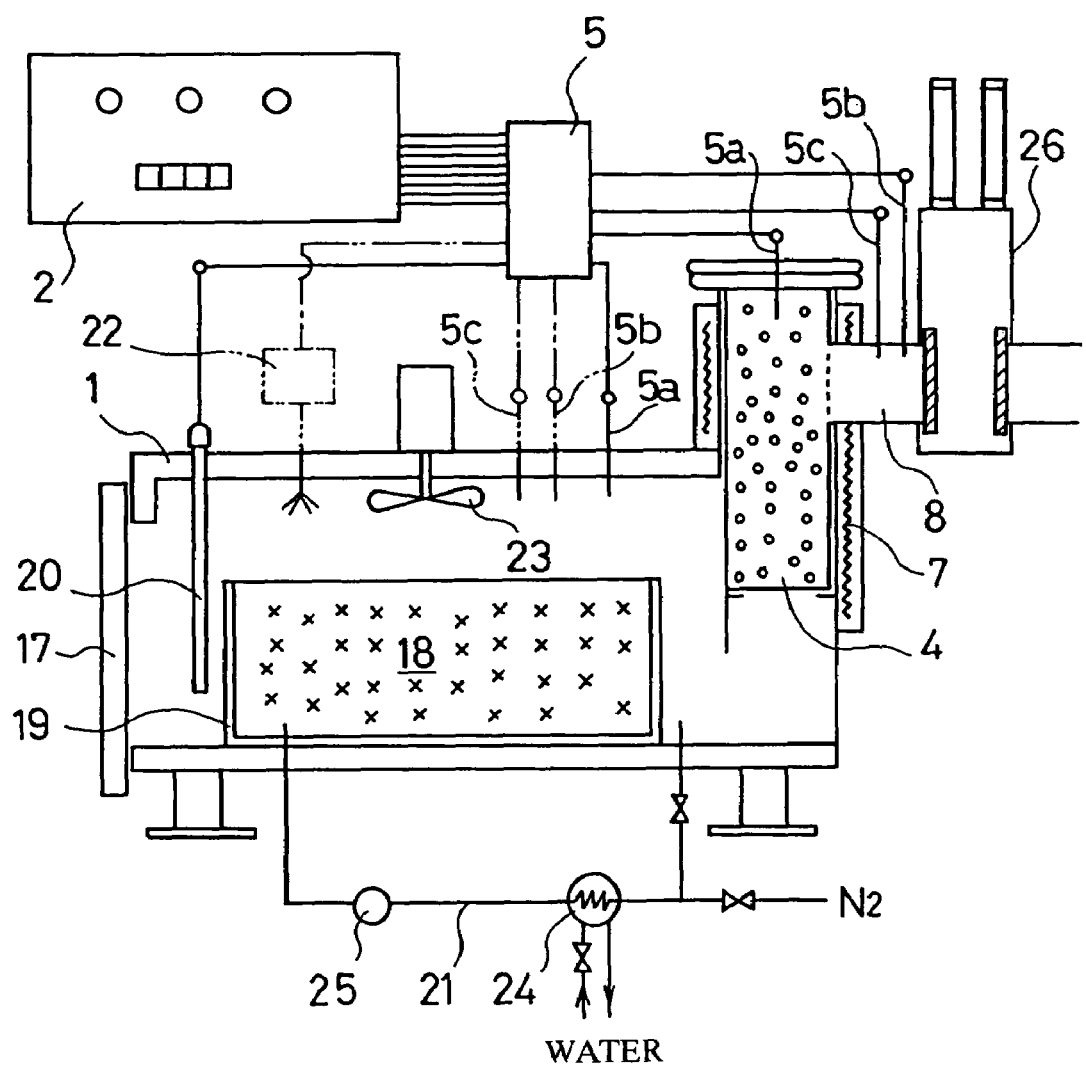
FIG. 2 is a structural diagram of a principal portion of the embodiment of the present invention.

An embodiment of the present invention will be explained based on the attached drawings. FIG. 1 is a diagram showing the entire structure of a thermal decomposition apparatus according to the present invention for carrying out a method according to the present invention, and FIG. 2 is a diagram showing a principal portion thereof.

A thermal decomposition furnace 1 includes a control device 2 for controlling the temperature in the furnace, a recovery device 3 for evaporated metals, furnace reducing means, furnace heating means 20, and cooling means 21, and moreover as a reduced pressure thermal decomposition furnace, enables the recovery of valuables by providing structure and a mechanism for pressure reduction composed of vacuum valves 40 and 42 and the subsequent parts which will be described.

Furthermore, a sensor group 5 composed of a temperature sensor, a vacuum degree sensor, an oxygen and oxide concentration sensor, and a chlorine and chloride concentration sensor and the like is placed in the thermal decomposition furnace 1, whereby the temperature, the degree of vacuum, the concentration of at least either one of oxygen or oxide gas, and the like in the furnace are measured, and data signals thereof are sent to the control device 2.

The thermal decomposition furnace 1 is surrounded by a heat insulating material, and a vacuum door 17 which is driven to ascend and descend by an air cylinder or the like is placed in a port for carrying in an object to be treated 18. The object to be treated 18 is carried into the furnace while stored in a jig 19 after the vacuum door 17 is opened. In the thermal decomposition furnace 1, stirring means 23 for the object to be treated 18 is placed as required in addition to the heating means 20 and the cooling means 21 inside the furnace. The stirring means 23 illustrated is a fan, but not limited to this, in place of this or together with this, a screw which gets into the jig 19 to stir the object to be treated 18 may be placed, or a rotary kiln method in which the entire furnace is rotated may be adopted.

Commonly, a heater is used as the heating means 20, and a nitrogen gas circulating circuit is used as the cooling means 21. A water cooling type cooler 24 for cooling nitrogen gas and a pump 25 for circulating the nitrogen gas in the thermal decomposition furnace 1 are provided in the nitrogen gas circulating circuit 21. It is more preferable that a filter is further provided in the circulating circuit.

A reducing retort 4 as the furnace reducing means is placed in a produced gas reducing section protruding from the thermal decomposition furnace 1. A metal reducing agent such as an aluminum powder or the like alone or together with alkali hydroxide is filled into the reducing retort 4, and a temperature sensor 5a for detecting the temperature in the reducing retort 4 is placed.

A heater 7 which can heat the interior of the reducing retort 4 to about 800° C. to about 1200° C. is embedded in a heat insulating material surrounding the reducing retort 4. An oxygen concentration sensor 5b and a chlorine concentration sensor 5c are placed in a reducing gas outlet 8 formed downstream of the reducing retort 4. The reducing gas outlet 8 leads to the following recovery means 3, and a vacuum door 26 having vacuum-proof performance, which is commonly driven to ascend and descend by a cylinder, is placed midway between them. Evaporated substances generated in the thermal decomposition furnace 1 are introduced into the recovery device 3, and the recovery device 3 carries out the function of removing dioxins generated by heating and residual dioxins in the object to be treated 18.

As is commonly known, dioxins are generated in a temperature region not less than 200° C., and dioxins in residual ashes and the like are decomposed when the temperature is 500° C. or more. Thermal decomposition in the thermal decomposition furnace 1 is normal pressure thermal decomposition in the range of 500° C. or thereabouts. Although a large amount of dioxins are generated, dioxins in produced gases are decomposed by introducing the produced gases into the reducing retort 4 heated to not less than 500° C., and oxygen and chlorine atoms are dissociated. The dissociated oxygen and chlorine immediately react chemically with a metal reducing agent with small reaction energy such as aluminum, magnesium, or the like filled in the reducing retort 4 to thereby be removed, and contribute again to prevent the generation of dioxins.

Even if passing through the reducing retort 4, oxygen and chlorine are not necessarily removed completely. Especially when decomposition by thermal decomposition is too early, their removal becomes incomplete, and they flow out to the reducing gas outlet 8. Then, the concentrations of at least either one of oxygen or oxide gas and at least either one of chlorine or chlorides are detected and analyzed by the oxygen concentration sensor 5b and the chlorine concentration sensor 5c, and when the concentrations are high, measures to retard the decomposition by lowering the furnace temperature or stopping heating and the like are taken. Moreover, when pressure reducing means is mounted, the generation of oxygen and chlorine is reduced by treatment under reduced pressure, thereby preventing the generation of dioxins.

Incidentally, since analysis by the ratio of mixed components of gas can not be performed, concerning the analysis of concentrations of oxygen and oxides by the oxygen concentration sensor 5b, the performance of analysis of concentration of at least any one of $O_2$, CO, $CO_2$, and the like is suitable, and concerning the analysis of concentrations of chlorine and chlorides by the chlorine concentration sensor 5c, the performance of analysis of concentration of at least any one of $Cl_2$, HCl, HClO, and the like is also suitable.

In the case where the interior of the furnace is purged by nitrogen gas from the cooling means 21 immediately after the object to be treated 18 is thrown into the thermal decomposition furnace 1 or in the case where the pressure reducing means is provided, heating can be performed after the interior of the furnace is evacuated to about 1 Torr to $10^{-2}$ Torr and the amount of oxygen inside a system is decreased, whereby the consumption of a reducing agent can be reduced.

Moreover, in the thermal decomposition apparatus of the present invention, the oxygen concentration sensor 5b and the chlorine concentration sensor 5c in the aforethe embodiment are placed not at the reducing gas outlet 8 but inside the thermal decomposition furnace 1, and in the thermal decomposition furnace 1, reducing agent supply means 22 for supplying a powdery, liquid, or gaseous metal reducing agent such as aluminum, magnesium, zinc, or the like into the furnace is provided, and the other structure is the same as in the aforethe first embodiment.

In this case, when the concentrations of oxygen, chlorine, and the like in the thermal decomposition furnace 1 are detected and analyzed by the oxygen concentration sensor 5b and the chlorine concentration sensor 5c respectively and exceed predetermined values, for example, the rise of the temperature in the furnace is stopped according to detected values, and simultaneously a metal reducing agent such as aluminum, magnesium, or the like is supplied into the thermal decomposition furnace 1 from the reducing agent supply means 22. Thus, aluminum oxide, aluminum chloride, or the like is produced, whereby the quantities of oxygen and chlorine and pressure in the thermal decomposition furnace 1 are controlled, preventing the generation of dioxins.

Subsequently, the structure of the recovery device 3 for evaporated metals, fine particle trapping means, vacuum means, and the like which are mounted in common in the present invention will be explained based on FIG. 1. The recovery means 3 is surrounded by a water-cooled space 27 and has a vacuum door 28 in one side surface from which a recovery retort 29 can be pressed out to the reducing gas outlet 8 through the vacuum door 26 by a cylinder not illustrated even during evaporation operation. Furthermore, the recovery retort 29 can be put in and out by opening and closing the vacuum door 26 during evaporation operation. Mounted in the recovery device 3 is recovered material cooling means 30 by means of nitrogen gas circulation which is the same as in the aforethe thermal decomposition furnace 1, and hence quick cooling of recovered materials is considered.

A fine particle filter is continuously placed at a stage subsequent to the recovery device 3, and fine particles not recovered in the recovery device 3 are captured. The fine particle filter is composed of a wire gauge fine particle filter 31 and an oil fine particle trap 32.

Figure 3:
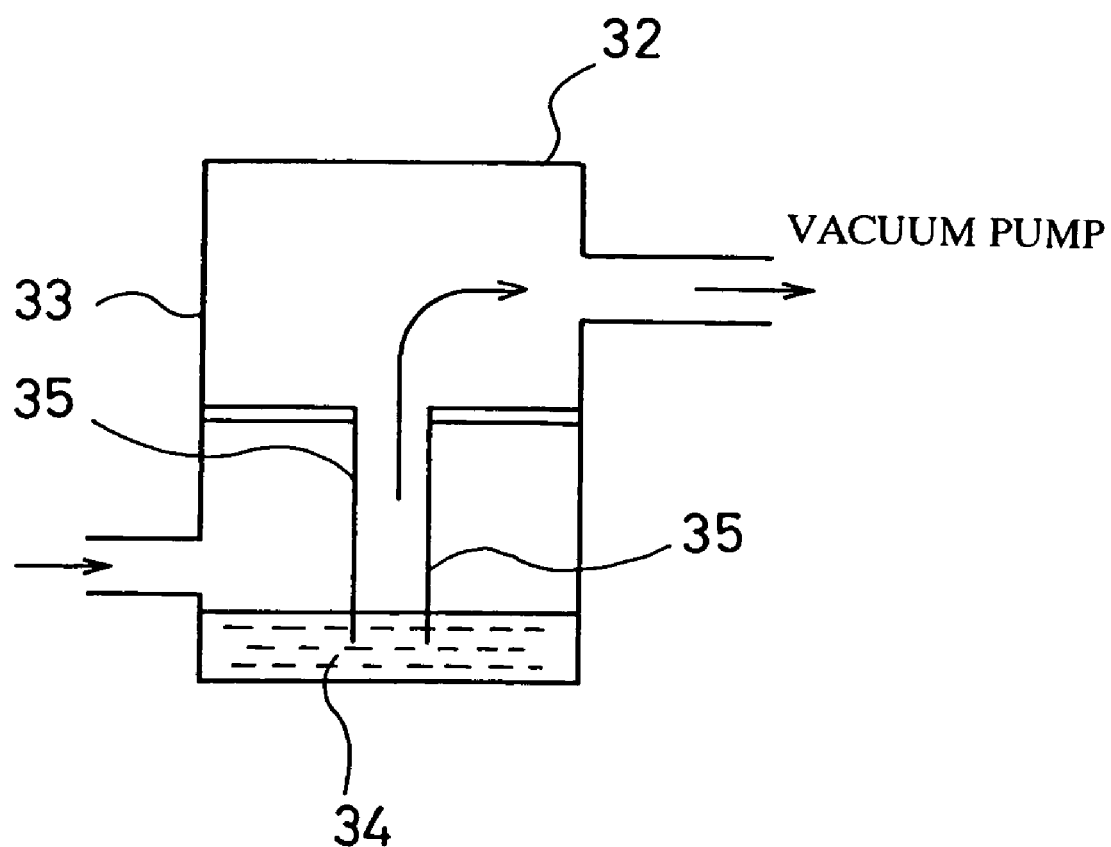
FIG. 3 is a structural diagram of an oil fine particle trap in the embodiment of the present invention.

As shown in FIG. 3, the oil fine particle trap 32 allows an oil film 35 to capture fine particles by putting up the oil film 35 commonly made of cloth, the lower portion of which is immersed in oil 34, in a case 33 storing the oil 34 in the bottom thereof and forcibly leading gas which has passed the wire gauge fine particle filter 31 to the oil film 35 to let the gas pass. The oil 34 rises in the oil film 35 by capillarity to form an oil film, and after capturing fine particles in gas which tries to pass it, falls into the oil 34 together with fine particles.

This oil fine particle trap 32 is specially effective in capturing and removing dioxins having the property of being easily soluble in oil. In the oil fine particle trap 32, an oil circulating circuit 39 including a pump 36, a filter 37, and an oil-water separator 38 is provided, and separation of oil and water and removal of captured fine particles in the oil 34 are performed there.

Next, the structure of a vacuum system provided continuously with the aforethe recovery system will be explained. In this example, the vacuum system branches out into a main line which operates when the degree of vacuum in the thermal decomposition furnace 1 is not more than a predetermined degree of vacuum ($10^{-3}$ Torr, for example) and a secondary line which operates when it exceeds the predetermined degree of vacuum. The main line is composed of a booster pump 41 and a water sealing pump 47 which are provided through the vacuum valve 40, and the secondary line is composed of a diffusion pump 43 and a rotary pump 44 which are provided through the vacuum valve 42.

An oil rotary pump is generally used as a vacuum pump for evacuating the interior of a system, but this exhaust means may come to be unusable when water is mixed therein. Hence, in the present invention, considering that thermal decomposition treatment of an object to be treated which generates moisture such as household refuse, shredder dust, or the like is also performed, the water sealing pump 47 may be used as an exhaust system.

In order to raise the degree of vacuum in the thermal decomposition furnace 1, the booster pump 41 and the water sealing pump 47 operate to thereby exhaust gas in the furnace. When the quantity of produced gases in the furnace decreases with the progress of thermal decomposition and the degree of vacuum reaches the predetermined vacuum of degree, the vacuum valves 40 and 42, and other valves perform opening and closing operation, and the flow of gas shifts from the main line to the secondary line. The secondary line is used mainly for recovery of metals, removal of elements, and the like. The diffusion pump 43 and the rotary pump 44 of the secondary line operate, and the evaporated substances are recovered while the degree of vacuum in the thermal decomposition furnace 1 is maintained at a degree of vacuum not less than the predetermined degree of vacuum. It should be noted that the numeral 45 is a holding pump for assisting the diffusion pump 43 together with the rotary pump 44.

A chlorine, NOx, SOx, and the like removing device utilizing water circulation of the water sealing pump 47 is placed downstream of the booster pump 41. The chlorine and the like removing device includes a water sealing pump water tank 48, a filter 49, an oil-water separating device 50, an alkali feed water tank 51, an ion-exchange resin tank 52, a cooler 53, and a pump 54 in addition to a water sealing pump 47.

An alkali tank 55 which is commonly a solution tank of calcium hydroxide or sodium hydroxide is connected to the alkali feed water tank 51, and thus water in the alkali feed water tank 51 is circulated in the alkali tank 55 by a pump 56. Therefore, pH-controlled water is sent to the ion-exchange resin tank 52.

Ion-exchange water from which salt such as sodium chloride or the like is removed by passing through the ion-exchange resin tank 52 is sent into the water sealing vacuum pump 47 by the operation of the pump 54 after being cooled by the cooling water 53. Gas is sent into the water sealing vacuum pump 47 from the main line of the vacuum system, and chlorine gas, NOx, SOx, and the like contained in the gas are changed into salt such as calcium salt or sodium salt by chemically reacting with an alkaline solution in the water sealing vacuum pump 47 and then sent to the water sealing pump water tank 48. Part of this salt is removed in the exchange resin tank 52 as described above.

Gas and a water solution are sent from the water sealing vacuum pump 47 into the water sealing pump water tank 48, where mercury is precipitated and collected in the bottom, and then taken out by timely turning on a cock. A gas vent passage 57 including an adsorption device 58 and a pump 59 is provided as an exhaust system in the water sealing pump water tank 48, and gas sucked out by the operation of the pump 59 is introduced into the adsorption device 58. The adsorption device 58 contains activated carbon, adsorbent such as zeolite or the like, and a catalyst such as vanadium oxide or the like for decomposing dioxins and the like, and mainly adsorbs and removes noxious components in the gas. The gas from which noxious components are removed in the aforethe manner is exhausted by the operation of the pump 59.

In the apparatus according to the present invention with the aforethe structure, the concentrations of oxygen and the like and chlorine and the like in the thermal decomposition furnace 1 are detected by the oxygen concentration sensor 5b and the chlorine concentration sensor 5c in the sensor group 5 at the time of thermal decomposition under reduced pressure as described above, and aluminum and aluminum oxide are produced in the thermal decomposition furnace 1 by the reducing agent supply means 22 according to the detected values, whereby the quantities of chlorine and oxygen, and the degree of vacuum are controlled.

Gases produced in a low temperature range are introduced into the reducing retort 4 and decomposed by heating, and chlorine, oxygen, and the like are removed by being captured by a metal reducing agent or hydroxides of alkali metals and alkali-earth metals there.

Incidentally, it is desirable in the present invention to measure not only the concentration of oxygen, but also the concentration of oxide gases such as carbon monoxide and carbon dioxide. This is because the produced gases are mixed gas of various types of decomposition products and the analysis of oxygen sometimes can not be precisely performed in the ppm order. An aluminum powder is suitable for a reducing agent. This is because the aluminum powder is inexpensive, and next to magnesium, it has small reaction energy, whereby it shows oxidation-reduction reaction such as $2O_2+3Al \rightarrow Al_3O_4$ even in low temperature.

Gases produced in the thermal decomposition furnace 62 are introduced into the recovery device 3 by opening the vacuum door 26 as described above, and metallic evaporated substances such as cadmium, lead, zinc, chromium, or nickel, water, oil, and the like are condensed and recovered in the recovery retort 29.

Figure 4:
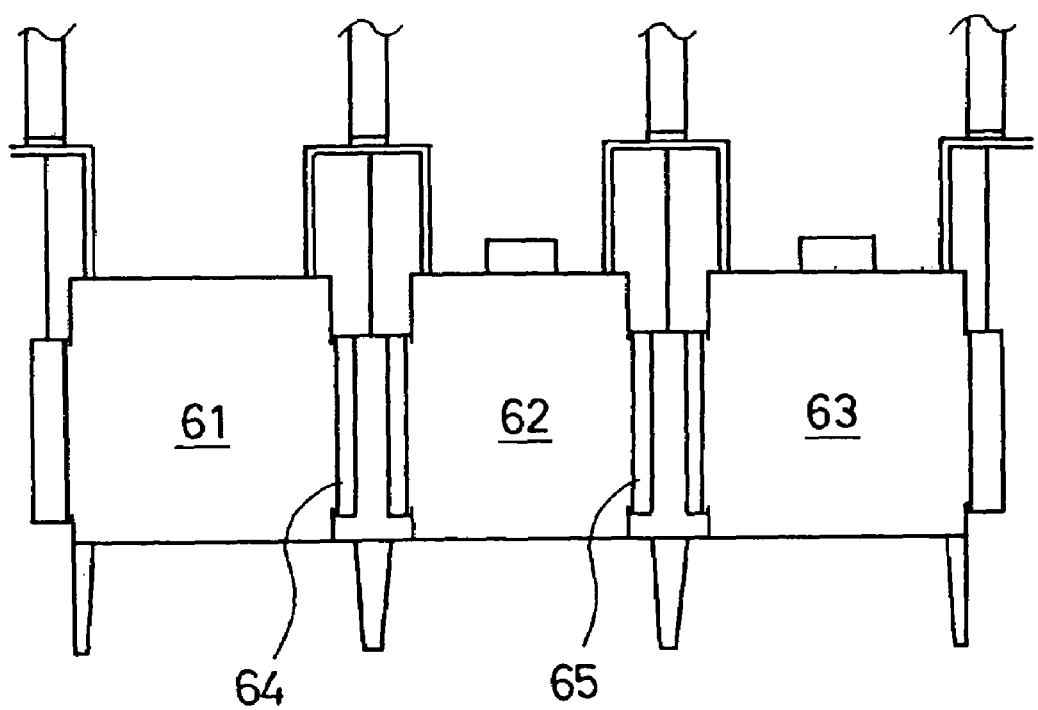
FIG. 4 is a structural diagram of a principal portion of another embodiment of the present invention.

Besides the structure in which the heating means 20 and the cooling means 21 are mounted in one chamber as described above, the thermal decomposition furnace can have triple chamber structure composed of a purge chamber 61 for introducing the object to be treated 18 therein and performing pre-evacuation, a heating chamber 62 including reducing means for performing vacuum heat treatment, and a cooling chamber 63 for cooling a treated matter (See FIG. 4). In this case, a vacuum heat insulating door system and a vacuum system are provided continuously between the chambers.

In the case where the thermal decomposition furnace 62 has such a triple chamber structure, throughput increases and treatment efficiency rises, and unmanned treatment also becomes possible.

Figure 5:
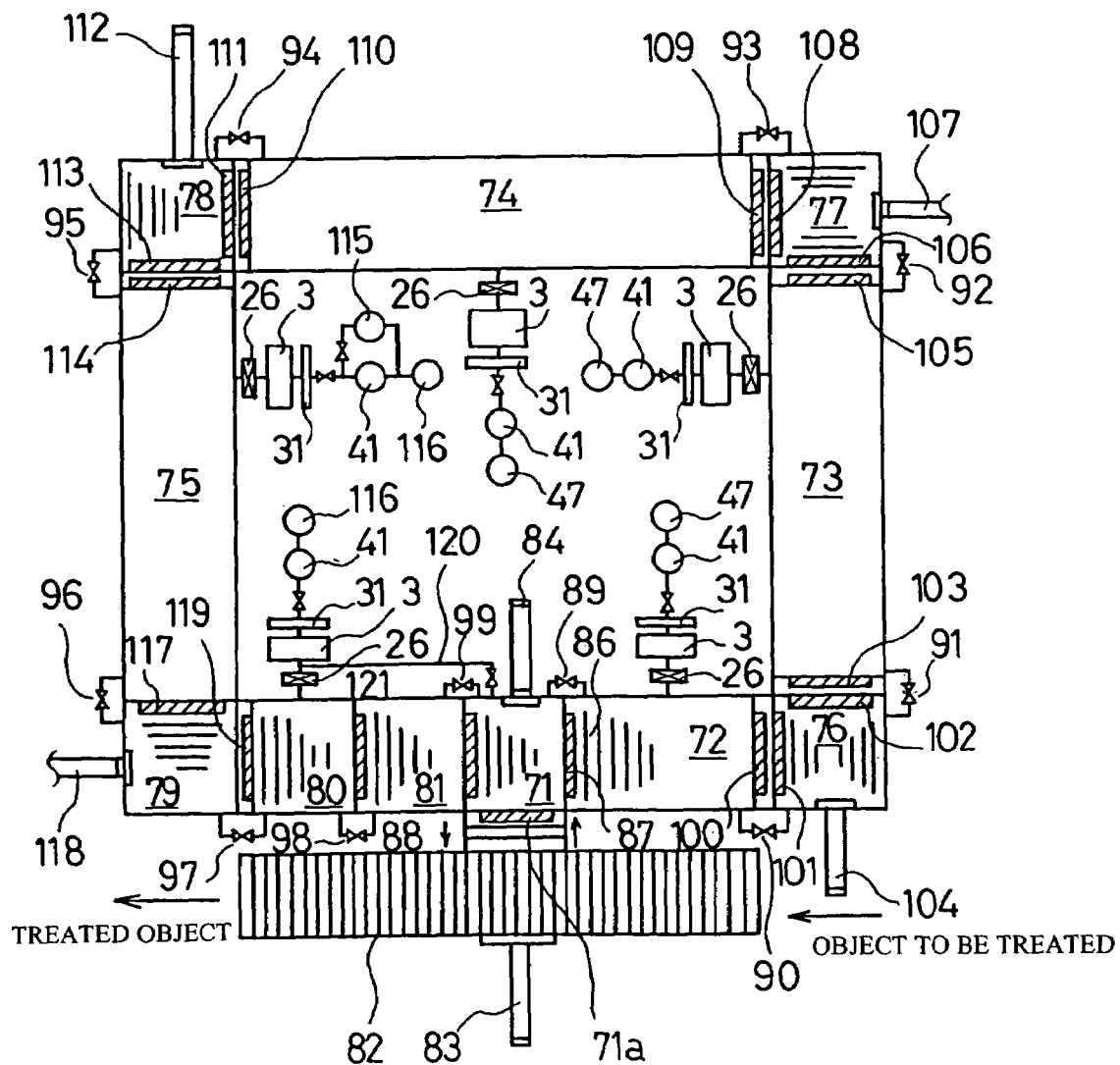
FIG. 5 is an entire structural diagram of still another embodiment of the present invention.
Figure 6:
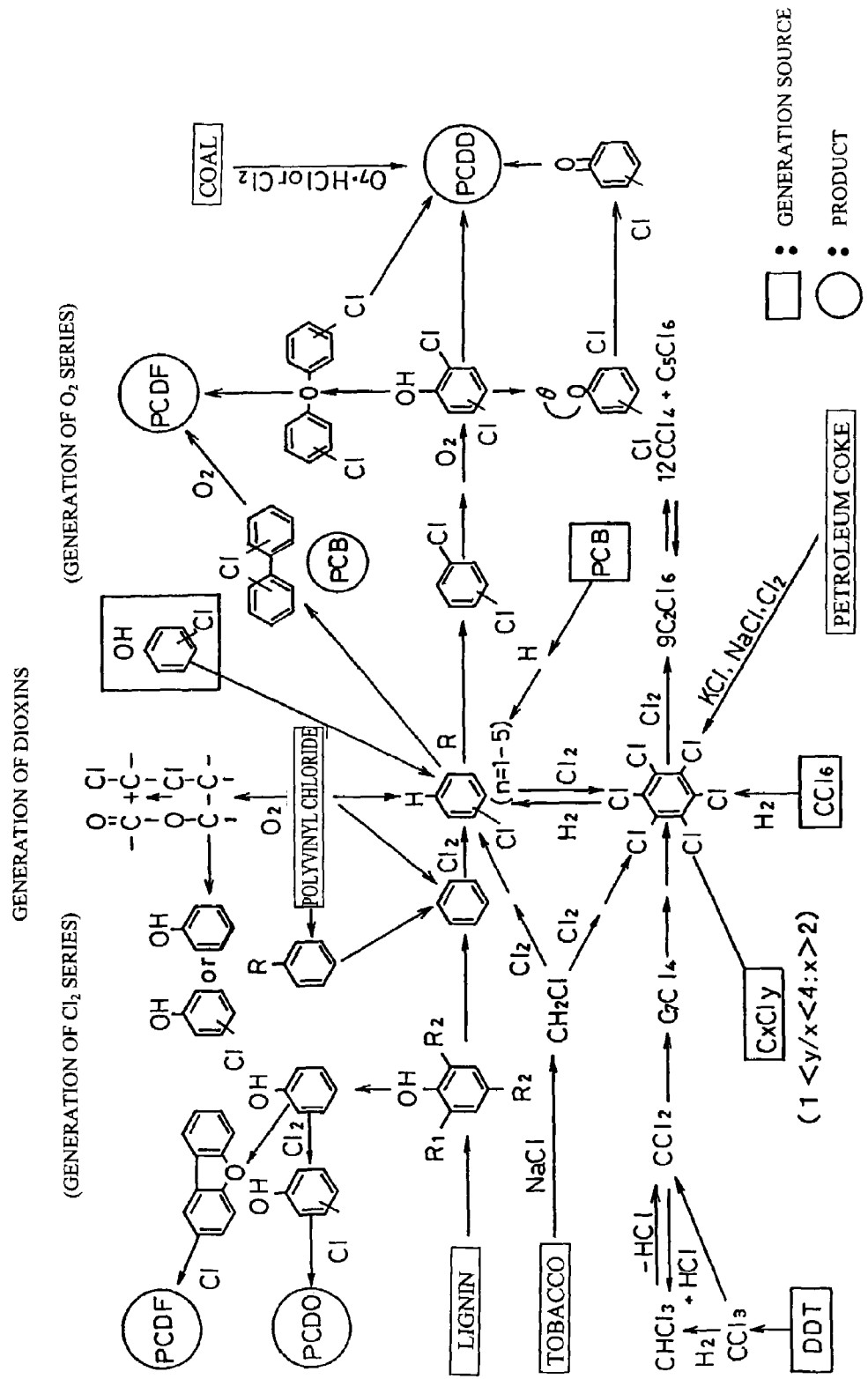
FIG. 6 is a system diagram of the generation of dioxins presumed by Choudhry et al.

The aforethe structures each composed of the thermal decomposition furnace 62, recovery system, and vacuum system are sometimes provided continuously in plurality, in which case treatment temperatures in a plurality of thermal decomposition furnaces 62 are made different. When being provided continuously, they may be provided linearly, but quadrangular arrangement, for example, is more advantageous in terms of saving space. As an example thereof, FIG. 5 shows an apparatus including four thermal decomposition furnaces 1 and structured to be quadrangular as a whole. The apparatus includes a purge chamber 71 for introducing objects to be treated, a preheating chamber 72 adjacent to the purge chamber 71, three vacuum heating chambers (which correspond to the thermal decomposition furnace 1) 73 to 75 constituting three sides of the quadrangular apparatus, four separating chambers 76 to 79 placed between the vacuum heating chambers, in other words, in the four corners of the apparatus, and one or a plurality of cooling chambers 80 and 81 provided adjacent to the last-stage separating chamber 79.

The object 18 to be treated is transferred to the way in/out of the purge chamber 71 by a transfer roller 82, and sent into the purge chamber 71 by a push-in cylinder 83 added to the transfer roller 82 after a vacuum door 71a is opened. The object 18 to be treated is returned to the purge chamber 71 after the completion of all treatment. Namely, the purge chamber 71 serves both as an entrance and an exit of the apparatus. Provided in the purge chamber 71 is a push-out cylinder 84 for pushing out the object 18 to be treated, by which the treated object returned to the purge chamber 71 is pushed out to the outside of the chamber, and carried out while being placed on the transfer roller 82. Although not illustrated, a vacuum pump is provided in the purge chamber 71, and substitution of air is performed.

A transfer conveyor 86 extending from the cooling chambers 80 and 81 to the preheating chamber 72 and the first separating chamber 76 with the purge chamber 71 between them is placed. Vacuum doors 87 and 88 are placed in both side faces of the purge chamber 71, which allows the object to be treated to move between the chambers. Bypasses 89 to 99 (The bypass 96 is provided as required.) each including an on-off valve are provided between all the aforethe chambers, which permits the pressures in chambers to be equalized before the vacuum doors between the chambers are opened.

The preheating chamber 72 is a chamber including heating means for preheating the object to be treated sent from the purge chamber 71 by the transfer conveyor 86 to about a maximum of 150° C. commonly, in which as is the case with the aforethe single furnace, the structure of a recovery system, a vacuum system, and an exhaust system including the recovery device 3, the fine particle filter 31, the booster pump 41, the water sealing-type vacuum pump 47 and the following, is provided through the vacuum door 26. The structure and operation of these produced gas treating systems and the like are the same as those described above, and thus the explanation thereof is omitted. Incidentally, in a vacuum heating chamber with a temperature not more than 500° C., similarly to the above, the reducing retort 4 is placed at a gas outlet.

Vacuum double doors composed of a heat insulating door 100 facing the preheating chamber 72 side and a vacuum door 101 facing the first separating chamber 76 side are placed between the preheating chamber 72 and the first separating chamber 76. Moreover, vacuum double doors composed of a vacuum door 102 facing the first separating chamber 76 side and a heat insulating door 103 facing the first vacuum heating chamber 73 side are placed between the first separating chamber 76 and the first vacuum heating chamber 73 adjacent thereto. The first separating chamber 76 includes a push-feed cylinder 104 for transferring the object to be treated sent from the preheating chamber 72 to the first vacuum heating chamber 73.

The first separating chamber 76 divides the preheating chamber 72 and the first vacuum heating chamber 73, prevents evaporated substances from the preheating chamber 72 from flowing into the first vacuum heating chamber 73, and has a function of regulating the degree of vacuum between the chambers. The evaporated substances are precipitated there, whereby vacuum sealing properties of the vacuum double doors are protected. The later separating chambers 77 to 79 also have the same function as the first separating chamber 76. Incidentally, evacuation of the separating chambers 76 to 79 can be performed by the booster pump 41 and the water sealing-type vacuum pump 47 in the previous-stage chamber (the preheating chamber 72 in the case of the first separating chamber 76).

The first vacuum heating chamber 73 also includes the same structure of a recovery system and a vacuum system as the preheating chamber 72. Vacuum double doors composed of a heat insulating door 105 facing the first vacuum heating chamber 73 side and a vacuum door 106 facing the second separating chamber 77 side are placed between the first vacuum heating chamber 73 and the second separating chamber 77. The transfer of the object to be treated in the first vacuum heating chamber 73, and therefrom to the second separating chamber 77 is performed by pusher drive by the push-feed cylinder 104, tray pusher, or the like (The transfer progresses by pushes of a plurality of objects to be treated from behind), and the transfer after its entry into the second separating chamber 77 is performed by roller drive.

The first vacuum heating chamber 73 is operated, for example, at a vacuum degree of 600 Torr to $10^{-2}$ Torr and at a temperature between 150° C. and 500° C., and thermal decomposition of most of the substances is completed there. The produced gases are treated by the furnace reducing agent or the reducing retort 4, oxygen and chlorine are removed therefrom, and moreover the quantities of generation of oxygen and chlorine are controlled by the control of temperature and vacuum degree. The above is the same as in the following vacuum heating chambers.

The second separating chamber 77 includes a push-feed cylinder 107 for sending the object to be treated sent from the first vacuum heating chamber 73 into the second vacuum heating chamber 74. Vacuum double doors composed of a vacuum door 108 facing the second separating chamber 77 side and a heat insulating door 109 facing the second vacuum heating chamber 74 side are placed between the second separating chamber 77 and the second vacuum heating chamber 74.

The second vacuum heating chamber 74 also includes the same structure of a recovery system, a vacuum system, and an exhaust gas system as above. The second vacuum heating chamber 74 is operated, for example, at a vacuum degree between about $10^{-1}$ Torr and $10^{-3}$ Torr and at a temperature in the range of 500° C. to 900° C. and has the aim of fully decomposing and evaporating undecomposed components in a thermally decomposed residue and recovering evaporated metals.

Vacuum double doors composed of a heat insulating door 110 facing the second vacuum heating chamber 74 side and a vacuum door 111 facing the third separating chamber 78 side are placed between the second vacuum heating chamber 74 and the third separating chamber 78. The transfer of the object to be treated in the second vacuum heating chamber 74, and therefrom to the third separating chamber 78 is performed by pusher drive by the push-feed cylinder 107, and the transfer after its entry into the third separating chamber 78 is performed by roller drive.

The third separating chamber 78 includes a push-feed cylinder 112 for sending the object to be treated sent from the second vacuum heating chamber 74 into the third vacuum heating chamber 75. Vacuum double doors composed of a vacuum door 113 facing the third separating chamber 78 side and a heat insulating door 114 facing the third vacuum heating chamber 75 side are placed between the third separating chamber 78 and the third vacuum heating chamber 75.

The third vacuum heating chamber 75 includes a mechanism in which a diffusion pump 115 and a rotary pump 116 are added to a vacuum system in addition to the same recovery system and vacuum system as the aforethe vacuum heating chamber has. Besides, a heat insulating door 117 facing the fourth separating chamber 79 side is placed between the third vacuum heating chamber 75 and the fourth separating chamber 79. The transfer of the object to be treated in the third vacuum heating chamber 75, and therefrom to the fourth separating chamber 79 is performed by pusher drive by the pusher 112, and its movement in the fourth separating chamber 79 is performed by roller drive.

The fourth separating chamber 79 serves also as a first vacuum cooling chamber, and includes cooling means for the object to be treated and a push-feed cylinder 118 for sending the object to be treated sent from the third vacuum heating chamber 75 into the second cooling chamber 80. A vacuum door 119 is placed between the fourth separating chamber 79 and the second cooling chamber 80 adjacent thereto.

In the second cooling chamber 80, the recovery device 3, the fine particle filter 31, the booster pump 41, and the rotary pump 116 are disposed through the vacuum door 26, and a bypass passage 120 connecting the downstream side of the vacuum door 26 and the purge chamber 71 is formed. The third cooling chamber 81 is placed adjacent to the second cooling chamber 80 with a vacuum door 121 between them, and the cooling chamber 81 adjoins the purge chamber 71 with the vacuum door 88 between them.

In such structure, after the pressure in the purge chamber is equalized with external pressure by letting air into the purge room and the vacuum door 71a is opened, the object to be treated transferred up to the vacuum door 71a of the purge chamber 71 by the transfer roller 82 is sent into the purge chamber 71 by the push-feed cylinder 83, and then the vacuum door 71a is closed. At this time, the vacuum doors 87 and 88 are closed.

In this state, a vacuum pump provided in the bypass passage 120 operates to reduce the pressure in the purge chamber 71. Then, after the pressures in the purge chamber 71 and the pre-heating chamber 72 are equalized by opening the bypass 89, the vacuum door 87 is opened. Subsequently, after the object to be treated is sent into the preheating chamber 72 by the transfer conveyor 86, the vacuum door 87 is closed and the bypass 89 is closed.

The preheating chamber 72 has, for example, a vacuum degree in the range of 760 Torr to 1 Torr and a temperature between 0° C. and 150° C., and decomposition gas generated here and having passed through the reducing retort 4 is led to the recovery device 3 by opening the vacuum door 26, and recovery of evaporated substances, removal of fine particles, and removal of oxygen and chlorine are performed.

After the completion of treatment in the preheating chamber 72, the bypass 90 is opened, and thereby the pressures in the preheating chamber 72 and the first separating chamber 76 are equalized. Subsequently, after the double vacuum doors 100 and 101 are opened and the object to be treated is transferred into the first separating chamber 76 by the transfer conveyor 86, the double vacuum doors 100 and 101 are closed and the bypass 90 is closed.

Then, after the first separating chamber 76 is evacuated by the vacuum pumps 41 and 47, the bypass 91 is opened, and the pressures in the first separating chamber 76 and the first vacuum heating chamber 73 are equalized. Thereafter, the double vacuum doors 102 and 103 are opened, and the object to be treated is carried into the first vacuum heating chamber 73 by the push-feed cylinder 104. In the first vacuum heating chamber 73, heating in a vacuum (a vacuum degree of 600 Torr to $10^{-2}$ Torr) is performed, for example, in the temperature range of 150° C. to 500° C. Within this temperature range, most of organic substances and the like are decomposed and evaporated, and passing through the opened vacuum door 26 via the reducing retort 4, recovered in the recovery device 3. Furthermore, similarly to the above, removal of fine particles and removal of oxygen and chlorine are performed.

Also in the following vacuum heating chambers 74 and 75, the same operation is performed. More specifically, after the bypass 92 is opened and the pressures in the first vacuum heating chamber 73 and the second separating chamber 77 are equalized, the double vacuum doors 105 and 106 are opened, and the object to be treated is carried into the second separating chamber 77 by the push-feed cylinder 104. Then, after the double vacuum doors 105 and 106 are closed and the bypass 92 is closed, the bypass 93 is opened and the pressures in the second separating chamber 77 and the second vacuum heating chamber 74 are equalized. Subsequently, after the double vacuum doors 108 and 109 are opened, and the object to be treated is carried into the second vacuum heating chamber 74 by the push-feed cylinder 107, the double vacuum doors 108 and 109 are closed and the bypass 93 is closed. Incidentally, when the difference in pressure between respective separating chambers and vacuum heating chambers is large, the bypasses are opened after the pressures are regulated by using the vacuum pump. The same operation is performed also in the following vacuum heating chambers 74 and 75.

In the second vacuum heating chamber 74, heating in a vacuum (a vacuum degree of $10^{-1}$ Torr to $10^{-3}$ Torr) is performed, for example, in the temperature range of 500° C. to 900° C. Within this temperature range, cadmium, zinc, lead, and the like are decomposed and evaporated, and through the opened vacuum door 26, recovered in the recovery device 3. Furthermore, similarly to the above, removal of fine particles and removal of chlorine are performed.

In the same manner as above, after the bypass 94 is opened and the pressures in the second vacuum heating chamber 74 and the third separating chamber 78 are equalized, the double vacuum doors 110 and 111 are opened, and the object to be treated is transferred into the third separating chamber 78 by the push-feed cylinder 107. Then, after the double vacuum doors 110 and 111 are closed and the bypass 94 is closed, the bypass 95 is opened and the pressures in the third separating chamber 78 and the third vacuum heating chamber 75 are equalized. Subsequently, after the double vacuum doors 113 and 114 are opened, and the object to be treated is transferred into the third vacuum heating chamber 75 by the push-feed cylinder 112, the double vacuum doors 113 and 114 are closed and the bypass 95 is closed.

In the third vacuum heating chamber 75, heating in a vacuum (a vacuum degree of about $10^{-2}$ Torr to about $10^{-5}$ Torr) is performed, for example, in the temperature range of 900° C. to 1300° C. Within this temperature range, copper, tin, chromium, and the like are decomposed and evaporated, and through the opened vacuum door 26, recovered in the recovery device 3. Furthermore, similarly to the above, removal of fine particles and removal of chlorine are performed.

The third vacuum heating chamber 75 and the fourth separating chamber 79 always have the same pressure, and after the heat insulating door 117 is opened, the object to be treated is carried into the fourth separating chamber 79 by the push-feed cylinder 112, where temporary cooling of the object to be treated by a vacuum is performed.

After the completion of the temporary cooling, the object to be treated is transferred to the second cooling chamber 80. Prior to this, in the second cooling chamber 80, residual nitrogen gas in the chamber is exhausted by the operation of the rotary pump 116 and the booster pump 41 while the bypass 120 is closed. After the completion of the above treatment, the bypass 97 is opened and the pressures in the fourth separating chamber 79 and the second cooling chamber 80 are equalized. Then, the vacuum door 119 is opened, and the object to be treated is transferred to the second cooling chamber 80 by the push-feed cylinder 118. Thereafter, the vacuum door 119 is closed, and concurrently the bypass 97 is closed.

In the second cooling chamber 80, secondary cooling of the object to be treated by nitrogen gas is performed after nitrogen gas, equal to the amount exhausted, is put back. After the completion of this secondary cooling, the bypass 98 is opened, and treatment for equalizing the pressures in the second cooling chamber 80 and the third cooling chamber 81 is performed. Then, the vacuum door 121 is opened, and the object to be treated is transferred to the third cooling chamber 81 by the transfer conveyor 86. Thereafter, the vacuum door 121 is closed, and simultaneously the bypass 98 is closed, and then cooling by nitrogen is performed in the cooling chamber 81.

When tertiary cooling by nitrogen gas is completed in the third cooling chamber 81, the bypass 99 is opened, and treatment for equalizing the pressures in the third cooling chamber 81 and the purge chamber 71 is performed. Then, the vacuum door 88 is opened, and the object to be treated is carried out to the purge chamber 71 by the transfer conveyor 86. After the vacuum door 88 is closed and the bypass 99 is closed, the purge chamber 71 is returned to its original pressure, the vacuum door 71$a$ is opened, and the treated object is carried out onto the transfer roller 82 by the push-out cylinder 84.

Incidentally, in the third cooling chamber 81, only exchange of nitrogen gas for cooling is performed, and evacuation is not performed.

Therefore, treatment time is reduced, and also the cost of installing vacuum system equipment and the quantity of nitrogen gas can be reduced, and thus throughput is increased.

Embodiment 2

A treatment apparatus for replacing gas containing organic halides such as dioxins under normal pressure (760 Torr) will be explained (See FIG. 7).

This treatment apparatus includes a heating device for heating the object to be treated thrown into a closed container, a cooling device, continuous with the heating device, for cooling the heated residue of the object to be treated, means for detecting the concentrations of chlorine, oxygen, and the like in the closed container and controlling the concentrations based on them, means for transferring the object to be treated, and purging means for performing gas substitution in the closed container.

Now, a method for reducing the concentration of organic halides in the heated residue of the object to be treated capable of generating organic halides such as dioxins and hydrocarbon halide by heating will be mainly explained, but also as concerns organic halides generated by heating of the object to be treated, it is advisable to take measures such as recovery, decomposition, and the like of the organic halides.

Regarding the residue of the object to be treated resulting from heat treatment such as combustion, thermal decomposition, and the like, heating atmosphere gas containing organic halides and substances having organic halide generating capacity is purged with a purge gas immediately after the completion of heat treatment, and the concentrations of the organic halides and the substances having organic halide generating capacity in the treatment container are reduced. Then, the object to be treated is cooled in this state. Thus, the residual concentration of organic halides such as dioxins or the like in the object to be treated can be reduced and removed.

As a purge gas, nitrogen, a rare gas such as argon, air, or the like can be used. A condition demanded of the purge gas is that it is substantially organic halide-free. Moreover, it is suitable to use a purge gas which can not generate organic halides by reacting with the object to be treated. Since air contains oxygen, when it is used as a purge gas, there is a possibility that organic halides are regenerated during cooling depending on the structure and situation of the heated residue. Accordingly, it is more preferable to use nitrogen or a rare gas. Furthermore, instead of simple purge, it is suitable to reduce the pressure in the container, thereafter perform purge with a purge gas (substitution under reduced pressure), and subsequently perform cooling.

The means for transferring the object to be treated in the container may be selected according to the form and treatment conditions of the object to be treated. For example, a screw conveyor, a rotary kiln, a roller house, a tray pusher, a continuous mesh belt, or the like can be used.

Embodiment 3

Next, substitution treatment under reduced pressure will be explained (See FIG. 8, FIG. 9, and FIG. 10).

An apparatus used for this substitution treatment under reduced pressure further includes a pressure reducing device for reducing the pressure in the gastight container and a control device for controlling the pressure in the gastight container of the apparatus explained in the aforethe substitution under normal pressure.

After the object to be treated is heat-treated, the pressure in the gastight container is reduced to about 10 Torr to $10^{-2}$ Torr by a vacuum pump, and the object to be treated is cooled. The cooling of the object to be treated may be performed with the pressure remaining reduced or with the aforethe purge gas being introduced into the gastight container.

If the pressure in the gastight container is low, cooling of the object to be treated requires a lot of time, whereby tact time is lengthened, and hence it is desirable to perform cooling by introducing a purge gas in terms of productivity.

The performance of heat treatment itself of the object to be treated under reduced pressure is more effective in reducing the concentration of organic halides remaining in the heated residue of the object to be treated.

When heat treatment is performed under reduced pressure and cooling is performed without introducing a purge gas after substitution under reduced pressure, it is preferable to expose the heated residue to a non-oxidizing gas before letting out the cooled heated residue into the air. This is because the surface zone of the object to be treated tends to become very large and surface free energy tends to be excessive due to heating under reduced pressure, and thus there are some dangerous cases where strong ignition occurs if the heated residue is let out into the air as it is. Specially when the heated residue contains Mg, Al, or other metals, it is preferable to expose the heated residue to an non-oxidizing gas before letting out the heated residue into the air.

Embodiment 4

When heat treatment and cooling treatment of the object to be treated are performed in the same gastight container, the following batch of objects to be treated can not be introduced until cooling of the heated residue of the object to be treated is completed. In order to realize continuous treatment, it is recommended that a heating chamber and a cooling chamber be divided by a heat insulating door and a vacuum door. Moreover, when the object to be treated is heated also under reduced pressure, it is suitable to provide a purge chamber at a stage prior to the heating chamber.

For example, it is suitable to provide a purge chamber having a vacuum door at an input port of a hermetic zone including heating means and pressure regulating means. After the object to be treated is introduced into the purge chamber and the interior of the purge chamber is purged by a reduction in pressure or a purge gas, a vacuum door between the purge chamber and the gastight container for heat treatment is opened, and then the object to be treated is introduced into the gastight container. The adoption of such structure allows a new object to be treated to be introduced without air and the like being mixed into the gastight container even during heat treatment of the object to be treated.

Furthermore, when the object to be treated is transferred in chambers without the use of a jig tray, two connected purge chambers may be provided at a stage prior to a vacuum heating chamber. Besides, it is suitable to provide a jig such as a tray or the like capable of coming and going between the two purge chambers and a throwing device for the vacuum heating chamber. It is recommended that the tray come and go between the two purge chambers by transfer means such as a drawer or a pusher. Moreover, the object to be treated may be thrown into the vacuum heating chamber in pieces. It is recommended that the pressure of the purge chamber divided from the gastight container by the vacuum door be reduced and air be purged.

The heated residue of the object to be treated can be taken out of the gastight container for heat treatment in the same manner. Since cooling of the heated residue demands a lot of time, productivity is raised if the tray is turned.

For example, four chambers: a storing chamber capable of gastightly storing the heated residue; a cooling chamber for cooling the heated residue; a purge chamber for purging a purge gas for atmosphere, storing the transfer means for the heated residue such as a tray, a casing, and the like, and performing purge; and a discharge chamber for discharging the heated residue to a conveyor or the like under normal pressure are provided at the outlet of the gastight container for objects to be treated. These four chambers may include vacuum doors respectively so as to maintain gas tightness independently of one another. The heated residue is transferred between these four chambers by moving a jig such as a tray or the like. These chambers may be provided in the form of a grid (Each chamber is provided at each vertex of a quadrangle, for example).

The transfer of the heated residue from the gastight container for performing heat treatment to the storing chamber is performed by various transfer means, and in addition may be performed by providing the storing chamber below the gastight container and dropping the heated residue by gravity.

The heated residue of the object to be treated heat-treated in the gastight container is moved to the outlet side in the gastight container by a transfer device for objects to be treated provided in the gastight container, and then transferred to the storing chamber placed adjacent to this outlet. The tray is waiting in the storing chamber, and the heated residue is stored in this tray. Subsequently, the tray and the casing are moved to the cooling chamber, and the heated residue is cooled as described above. After the heated residue is cooled, the tray is moved to the discharge chamber, and discharged from this discharge chamber to a conveyor and the like.

The vacant tray from which the heated residue is discharged, is returned to the initial storing chamber via the purge chamber for purging air. The tray can make the rounds of chambers as described above.

Thus, by using a plurality of trays, predetermined treatment can be performed while the plurality of trays are making the rounds of chambers, thereby improving treatment efficiency.

Especially cooling of the heated residue requires a lot of time, and hence such round treatment is effective. If a plurality of cooling chambers are placed in a line between the initial storing chamber and the discharge chamber, productivity can be further improved.

Incidentally, it is recommended that the movement of the tray between the chambers be performed by the transfer means such as a pusher or a roller. It is also suitable to use a combination of a plurality of transfer means.

The aforethe provision of chambers capable of purge under reduced pressure at the inlet and the outlet of the gastight container for objects to be treated allows a new object to be treated to be introduced or allows the heated residue to be taken out even during heat treatment of the object to be treated. Thereby, it becomes possible to automate operation and raise productivity.

Embodiment 5

Next, an example of treatment of gases produced by heat treatment, preheating, purge, cooling, and the like of the object to be treated will be explained. Here, the gases are basically gases produced by heat treatment such as combustion, thermal decomposition, and the like of the object to be treated, but the case where the produced gases contain solid and liquid substances and the like mixed therein is not excluded.

The produced gases of the object to be treated contain organic halides such as dioxins in many cases, and also contains moisture, oil, metals, and compounds such as metallic oxides resulting from the object to be treated. Such substances need to be decomposed, removed, or recovered before letting out gas into the environment.

The produced gases of the object to be treated are reformed and decomposed by being heated to about 500° C. to about 950° C., or to about 500° C. to about 1200° C. It is desirable to perform this treatment in a reducing atmosphere.

At the time of this reforming, the promotion of decomposition of organic halides by the use of various kinds of catalysts, including palladium oxide, for decomposing organic halides, a ceramic in the shape of a honeycomb or the like, metals such as aluminum and the like is also recommended.

Furthermore, NOx, SOx, and $Cl_2$ in the produced gases may be removed by an alkali such as NaOH or $Ca(OH)_2$.

Moreover, since organic halides such as dioxins or the like remain in the reformed gas or are recomposed in some cases, it is recommended that a cooling device for cooling the reformed gas by a refrigerant such as water or oil be provided. It is preferable to perform this cooling rapidly so that the residence time of the produced gases at a temperature at which organic halides such as dioxins are produced can be shortened as much as possible. Besides, in order to prevent the generation of organic halides by reacting halogen in the produced gases with the alkali, it is also suitable that the refrigerant is alkaline, an alkali assistant is mixed in the refrigerant, or an alkali is injected in addition to the refrigerant. The refrigerant may be injected to the produced gases by a gas injector, a venturi, or the like. In addition, in some cases the produced gases contain dust, and hence it is desirable to provide a filter for removing the dust.

Accordingly, the cooling device is mounted with a dust filter, an alkali tank, a heat exchanger, a pump, and the like.

Gas which has passed the cooling device is sent to a recovery device for condensing residual condensates in the gas and recovering them. It is preferable to dispose an adsorption member such as an activated carbon filter or the like, providing for malfunctions, over load, and the like of the aforethe devices for making the produced gases innoxious at a stage prior to the exhaust pump for exhausting gas in the aforethe treatment system.

Embodiment 6

An example of treatment of produced gases when heat treatment is performed under reduced pressure will be explained now.

The produced gases of the object to be treated are reformed as described above, and sent to the recovery device for condensing and recovering water, oil, evaporated metals, oxides, and the like contained in the produced gases. Moreover, dust removal is performed by a filter, a cyclone, a liquid trap such as an oil trap, or the like for removing dust and the like still remaining in the produced gases.

Provided in the produced gas treatment system are a vacuum door and a vacuum valve so that the recovery of condensates, exchange of filters, and the like can be performed during heat treatment of the object to be treated while a space between the recovery device and the dust removing device is maintained gastight.

As concerns the taking out of the condensates to the outside of the system, it is preferable to expose the condensates to a non-oxidizing gas after cooling them and before letting them out into the air as described above. This is because the surface zones of the condensates tend to become very large and surface free energy tends to be excessive due to heating under reduced pressure, and thus there are some dangerous cases where strong ignition occurs if the condensates are let out into the air as they are. Specially in the case of metals such as Mg, Al, and the like, there is a possibility that a fire occurs, which is dangerous.

At the following stage, a gastight container for heating the object to be treated under reduced pressure and a vacuum pump for reducing the pressure in the produced gas treatment system are provided. It is suitable that the vacuum pump is selected out of a booster pump, a rotary pump, a water sealing pump, and the like, and that they are combined as required. A pump sucking at the back of the vacuum pump may be provided.

Similarly to the above, a cooling device for removing organic halides, NOx, SOx, and $Cl_2$ in the produced gases may be provided. It is preferable to also provide an adsorption device for fail-safe.

Embodiment 7

Figure 7:
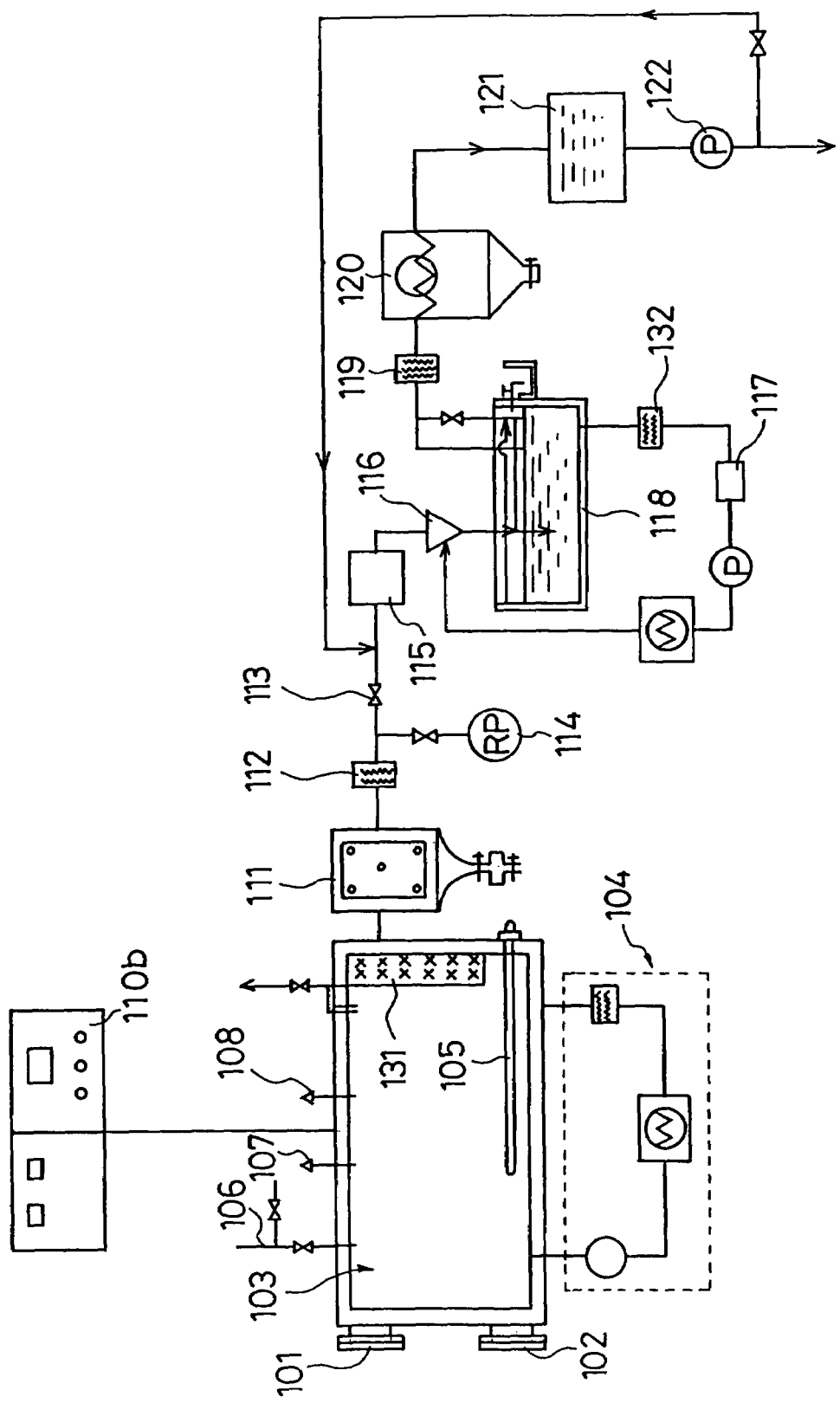
FIG. 7 is a diagram schematically showing an example of the structure of the treatment apparatus of the present invention.

FIG. 7 is a diagram schematically showing an example of the structure of the treatment apparatus of the present invention. This treatment apparatus can heat the object to be treated under almost normal pressure and prevent organic halides such as dioxins from remaining in the heated residue of the object to be treated.

Figure 8:
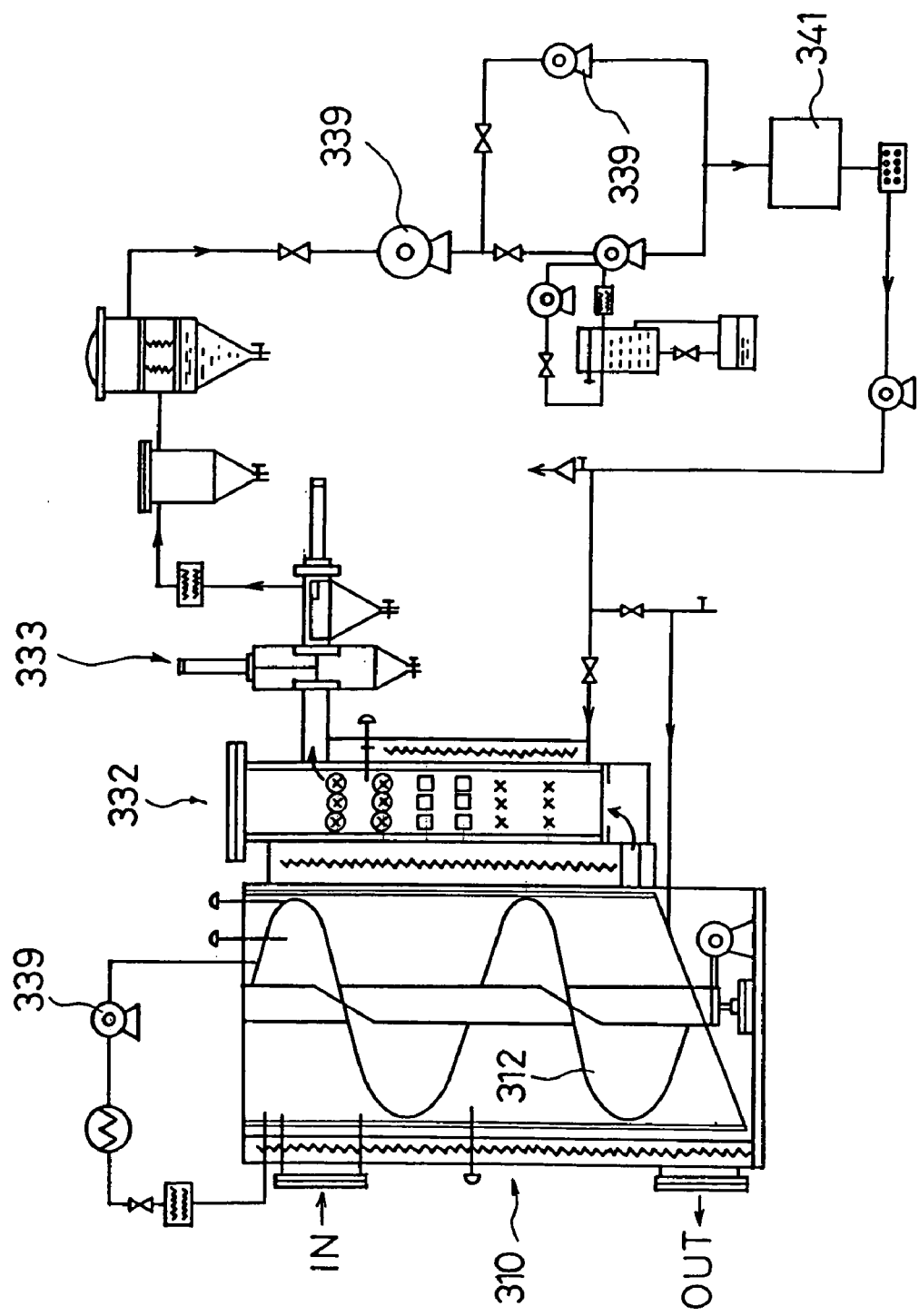
FIG. 8 is a diagram schematically showing an example of the structure of the treatment apparatus of the present invention.

FIG. 8 is a diagram schematically showing an example of the structure of the treatment apparatus of the present invention. This treatment apparatus can heat the object to be treated under reduced pressure and prevent organic halides such as dioxins from remaining in the heated residue of the object to be treated.

Figure 9:
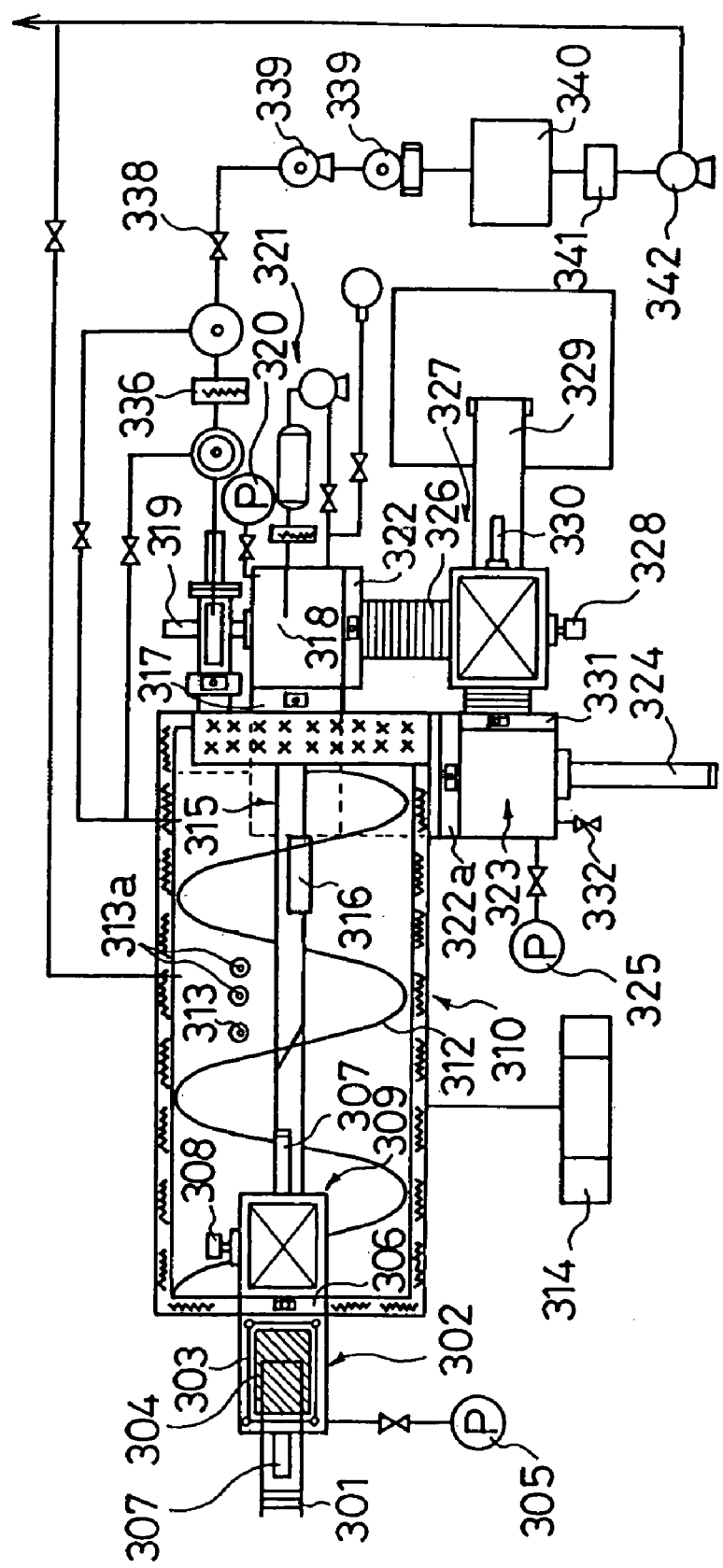
FIG. 9 is a diagram schematically showing an example of the structure of the treatment apparatus of the present invention.
Figure 10:
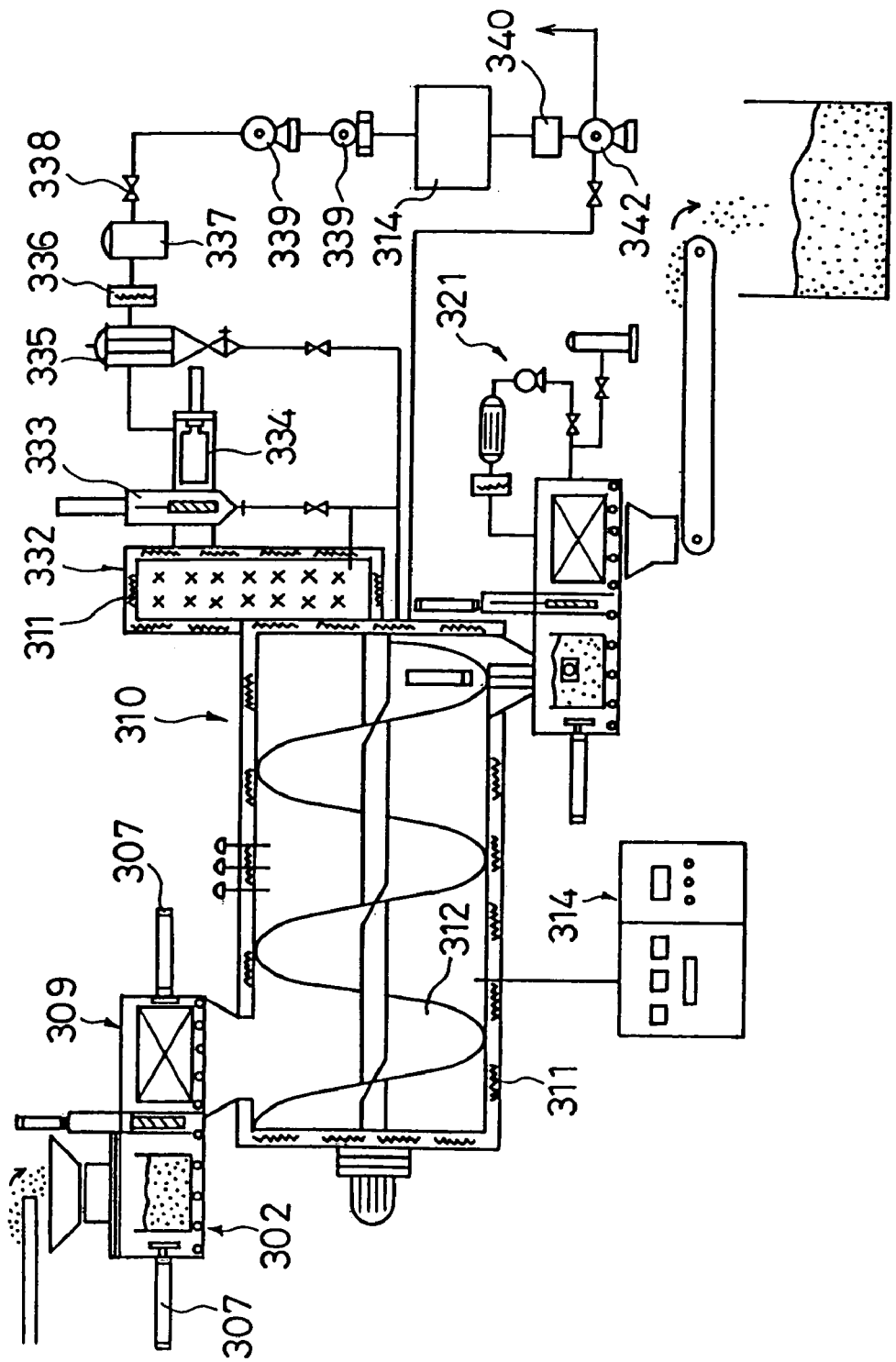
FIG. 10 is a diagram schematically showing an example of the structure of the treatment apparatus of the present invention.

FIG. 9 is a diagram schematically showing an example of the structure of the treatment apparatus of the present invention. This treatment apparatus enables continuous treatment, and an automatic throwing device for the object to be treated and an automatic take-out device for the heated residue are mounted in the reduced pressure-type treatment apparatus illustrated in FIG. 8.

The normal pressure-type treatment apparatus in FIG. 7 costs less than the reduced pressure-type one. The treatment apparatus substitutes a purge gas such as nitrogen for an atmospheric gas containing organic halides after heat-treating the object to be treated, and cools the object to be treated while the concentration of organic halides in the atmosphere is reduced. Thus, the concentration of organic halides remaining in the heated residue can be reduced.

In the example in FIG. 7, the object to be treated thrown from an input port 101 into a heat treatment furnace 103 is heated by a heater 105. In order to enhance temperature rise efficiency, a stirring device not illustrated may be provided to stir an atmosphere in the furnace or to stir the object to be treated. The temperature in the furnace is controlled by a control device 110b capable of controlling a temperature sensor 107 and the heater. Incidentally, a gas sensor 108 for detecting the gas concentration in the furnace is provided depending on the type of gas which needs to be detected, for example, oxygen concentration, chlorine concentration, or the like. Such gas concentration may be regulated by introducing a carrier gas such as nitrogen, a rare gas, or the like.

After the object to be treated is heated by the heat treatment furnace 103, a valve in a purge gas introduction system 106 is opened, and a purge gas is introduced to thereby reduce and remove organic halides in the atmospheric gas in the furnace.

Thereafter, the valve in the purge gas introduction system 106 is closed, and a gas cooling device 104 including a filter, a gas cooler, a pump in a bypass is operated to cool the heated residue by a purge gas atmosphere. After cooling is completed, the heated residue of the object to be treated is taken out of an exhaust port 102.

Meanwhile, gases produced by heating are led to a decomposition reaction container 131, where the produced gases let out from the heating furnace 103 are thermally decomposed and reformed by being reheated by the heater. Undecomposed gas is also decomposed.

To promote thermal decomposition of the produced gases, a spherical or honeycomb ceramic material, a catalyst, and a reducing agent (Zn, Al, Mg, or the like, for example), or the like may be thrown into the decomposition reaction container 131, and moreover an alkali agent for permitting NOx, SOx, $Cl_2$, and the like which are decomposition gases to be reacted and removed may be thrown thereinto. It should be noted that the aforethe ceramic, catalyst, and reducing agent can be used in combination or individually depending on gas conditions.

In some cases, the gas let out from the decomposition reaction container 131 still contains a variety of hydrocarbons. These components condense oil and moisture contained in the produced gases in a condensing device 111.

Dust and the like are removed from the gas which has passed through the condensing device 111 by a filter 112. A vacuum pump 114 such as a rotary pump is provided at a stage next to the filter 112. Gas substitution in the heat treatment furnace 103 only by introduction of a purge gas takes a lot of time, and requires a large amount of purge gas, whereby the quantity of gas to be treated is increased. Hence, it is desirable to first exhaust gas in the heat treatment furnace 103 by the vacuum pump 114, then introduce a purge gas to restore the pressure, and to perform cooling.

Through the filter 112 and a vacuum valve 113, the produced gases of the object to be treated are introduced to a gas heating furnace 115, where undecomposed gas of the produced gases, reproduced dioxins, residual dioxins, and the like are decomposed and reformed at temperatures as high as about 700° C. to about 1100° C.

The gas decomposed and reformed in the gas heating furnace 115 is cooled while being mixed by a cooling device 116 with a gas injector and introduced into a cooling water tank with an oil-water separating tank 118. It is preferable that this cooling is performed as rapidly as possible in order to shorten the residence time of the gas at a dioxin production temperature. For example, it is preferable to perform this cooling within ten seconds. Cooling water is utilized, circulating through an alkali tank 117 for keeping water used for cooling alkaline, a pump, a heat exchanger, and the cooling device 116, in which case NOx, SOx, $Cl_2$, and the like in the decomposition gas are also removed by reaction.

Furthermore, in the cooling water tank with the oil-water separating tank 118, condensates such as oil condensed by cooling are also recovered.

Since the gas which has passed through the oil-water separating tank 118 still contains dust and the like in some cases, the dust is removed by a filter 119, a bag filter 120, and the like. It is recommended that dust captured by a circulating system of alkaline water be removed by a filter 132.

Providing for the case where the produced gases of the object to be treated which have passed through the bag filter 120 contain noxious components which have not been removed, a gas adsorption device 121 is further placed at a stage next to the bag filter 120. Gas is exhausted from the back side of the adsorption device 121 by being sucked by a suction pump 122. It is preferable that the exhaust gas is let out after the concentration of noxious components is monitored. Moreover, a bypass for circulating the exhaust gas to the gas heating furnace 115 may be provided.

Embodiment 8

Next, a reduced pressure-type treatment furnace will explained by means of FIG. 9.

In this apparatus, a larger amount of objects to be treated can be treated by unmanned treatment of the objects to be treated as compared with a manual reduced pressure treatment apparatus in FIG. 8.

Incidentally, the manual reduced pressure treatment apparatus in FIG. 8 and the reduced pressure-type continuous apparatus have much in common with each other, and thus only different points will be explained. The object to be treated is transferred to a vacuum substitution chamber 302 by a conveyor 301, an upper vacuum door 303 is opened, the transferred object to be treated is thrown into an installed tray 304 (a jig), and the vacuum door 303 is closed.

Thereafter, the pressure in the substitution chamber 302 is reduced by a vacuum pump 305. Subsequently, an intermediate door 306 is opened to a next throwing chamber 309 connected to the substitution chamber 302, and the object to be treated in the tray is moved to the throwing chamber 309 by the transfer device 307.

Then, the intermediate door 306 is closed, and as for the object to be treated transferred to the throwing chamber 309, only the object to be treated is thrown into a heating furnace 310 by the throwing device 308 such as a rotating device placed in the throwing chamber 309.

After the throwing, the intermediate door 306 is opened, and the vacant jig 304 is returned to the vacuum substitution chamber 302 by the transfer device 307. The intermediate door 306 is then closed, and air is brought into the vacuum substitution chamber 302 to restore the pressure to normal pressure. Thereafter, the upper door 303 of the vacuum substitution chamber 302 is opened, and the following object to be treated is thrown into the tray 304.

By repeating the aforethe operation, the object to be treated can be thrown into the heating furnace 310 without air getting into the heating furnace 310.

The object to be treated thrown into the heating chamber 310 is moved to the treatment outlet side by a screw conveyor 312 while being heated by a heater 311. The furnace temperature is controlled by a temperature sensor 313 and a control device 314 for the heater. Incidentally, a gas sensor 313a is provided according to the type and content of gas.

The object to be treated transferred by the screw conveyor 312 while being heated in the heating furnace falls to the tray placed in a storing chamber at an output port 315 on the outlet side. When the quantity of falling objects reaches a set value, the screw conveyor 312 is stopped, a vacuum door 317 leading to the next chamber is opened, and the object to be treated is transferred to a cooling chamber 318 by a transfer device 316. Thereafter, the vacuum door 317 is closed.

The transferred object to be treated is cooled by a gas cooling device 321 for circulating a cooling gas such as nitrogen or the like.

During this cooling, an intermediate door 322a is opened and the vacant tray placed in a vacuum substitution chamber 323 is transferred to a storing chamber 315 by a transfer device 324.

Thereafter, the intermediate door 322a is closed and the screw conveyor 312 is rotated. During this operation, a vacuum valve 332 is opened to introduce air into the vacuum substitution (purge) chamber, whereby the pressure is restored.

The object to be treated cooled in the cooling chamber 318 is carried out onto the a conveyor 326 by a transfer device 319 after a vacuum door 322 on the outlet side placed in the perpendicular direction is opened. The vacuum door 322 is then closed, and pressure reduction by a vacuum pump 320 is performed.

The object to be treated on the conveyor 326 is transferred to a rotating throwing chamber 327, and the object to be treated only is thrown onto a take-out conveyor 329 by a rotating device 328.

After the throwing, the vacant tray is sent to a vacuum purge chamber 323 by a transfer device 330 after a vacuum door 331 is opened. The vacuum door 331 is then closed, and the pressure in the vacuum substitution chamber is reduced by a vacuum pump 325.

The aforethe structure enables the heated residue of the object to be treated to be taken out of the heating furnace while gas tightness in the heating furnace is maintained.

The manual reduced pressure furnace and the continuous reduced pressure furnace are different in that the throwing and taking out of the object to be treated are performed manually or automatically, and in that the continuous furnace has the vacuum substitution chamber, the throwing chamber, the storing chamber, and the cooling chamber at the inlet and the outlet of the heating furnace. Furthermore, in the case of the manual reduced pressure furnace, cooling is performed in the heating furnace.

Embodiment 9

Next, the treatment of the produced gases let out from the heating furnace 310 will be explained based on FIG. 10.

The produced gases resulting from heating of the object to be treated are led to a decomposition reaction chamber 332 continuous with the heating furnace 310, and including undecomposed components, reheated, thermally decomposed, and reformed. As described above, ceramics, a catalyst, and a reducing agent are thrown into the decomposition reaction chamber 332 to promote decomposition of respective gases. Moreover, to remove noxious gases such as NOx, SOx, $Cl_2$, and the like in the decomposed gases, an alkali agent is thrown in. The aforethe decomposition promoter and alkali agent can be used individually or in combination depending on gas conditions.

Placed at a stage next to the decomposition reaction chamber 332 is a vacuum door 333 for hermetically sealing the heating furnace 310 and the decomposition reaction chamber 332. The produced gases which have passed through the decomposition reaction chamber 332 are led to a recovery device 334 connected to the decomposition reaction chamber 332 and capable of condensing and recovering water, oil, metals, and oxides in the produced gases, and further led to a cyclone 335, a filter 336, and an oil liquid trap 337, which are connected to the recovery device and remove dust in gas.

At a stage after the oil liquid trap 337, a vacuum valve 338 for hermetically sealing a space between the vacuum door 333 and the oil liquid trap 337 is provided. Thanks to double sealing by the vacuum valve 338 and the vacuum door 333, evaporated substances originating from the object to be treated can be condensed and recovered, and replacement of filters can be performed even during operation. If cooling is performed while a cooling gas such as nitrogen or the like is circulated in the recovery device as described above, recovery time is shortened, and a fire is difficult to cause.

At a stage following the vacuum valve 338, a pressure reducing device 339 for reducing the pressure in the aforethe treatment system, such as a rotary pump, a booster pump, a water sealing pump with an ejector, or the like, and a pollution gas removing device 340, connected to the pressure reducing device, for removing residual dioxins in gas and other pollution gases such as NOx, SOx, $Cl_2$, and the like are placed. In the pollution gas removing device 340 for removing pollution gases, gas is heated at a high temperature by a heater, and within about ten seconds, brought into an ejector type cooling device, and cooled rapidly, thereby preventing recomposition of organic halides. An ejector method may be used for the device as described above. It is preferable that water to be used is alkaline and circulated, and mixed with the aforethe gas to remove noxious components. Also, other methods such as plasma decomposition, corona discharge decomposition, glow discharge decomposition which are dry treatment may be used.

The gas let out from the pollution gas removing device 340 is introduced into an adsorption device 341 which is connected to the pollution gas removing device and adsorbs the remaining pollution gas, and a suction pump 342 which is connected to the adsorption device and sucks in gas in the devices following to the vacuum pump 339.

Embodiment 10

Applying the present invention, treatment of shredder dust is performed. Automobile shredder dust is prepared as a sample. This sample is composed of the following six types of fractions. Incidentally, as for the automobile, minica (manufactured by Mitsubishi Motors Corporation) is used.
 (1) vinyl chloride (10 wt %)
 (2) polypropylene (10 wt %)
 (3) polyurethane (10 wt %)
 (4) rubber (10 wt %)
 (5) polyurethane (10 wt %)
 (6) others (50 wt %)
The fraction (6) is press-treated.

Such shredder dust is treated by thermal decomposition under normal pressure (600° C. and 800° C.) and thermal decomposition under reduced pressure (600° C. and 800° C.), and the concentration of dioxins contained in the thermally decomposed residue thereof is measured.

Figure 11:
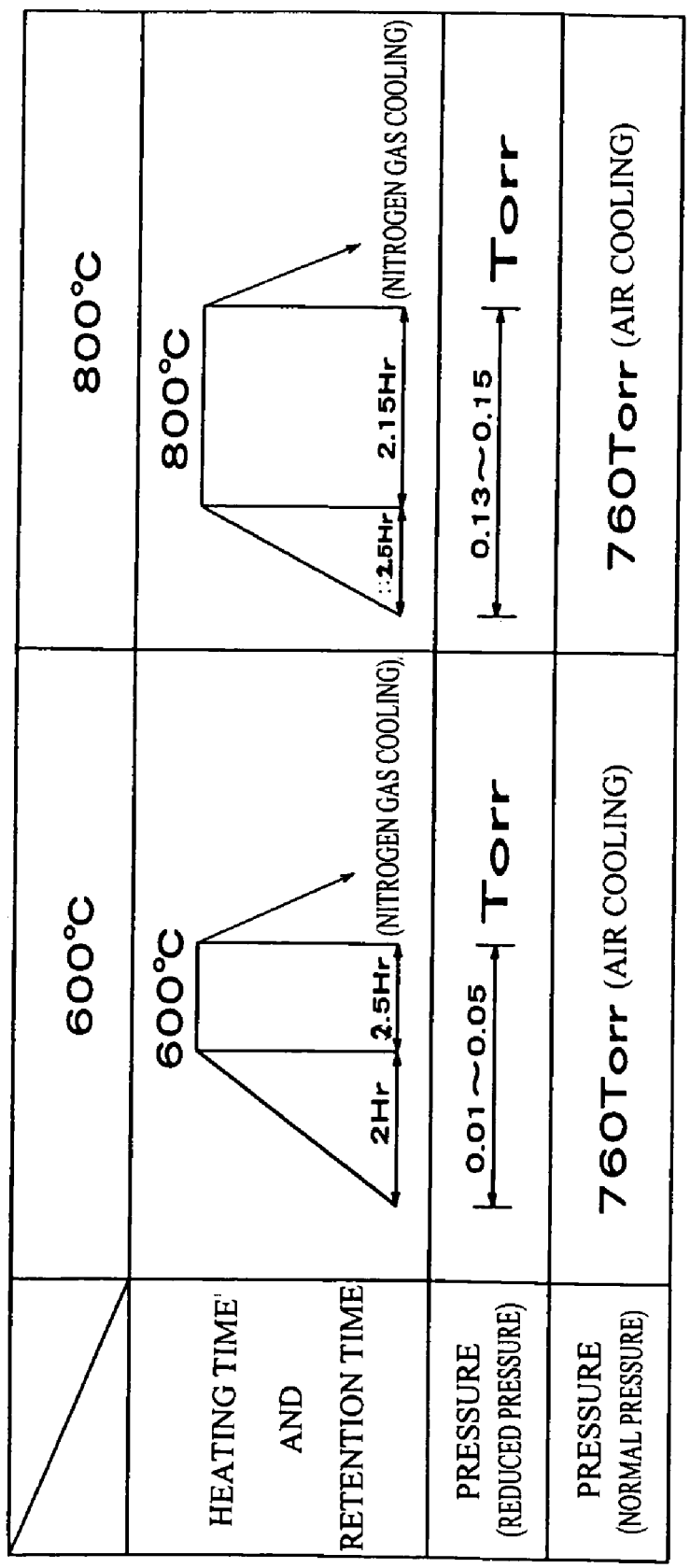
FIG. 11 is a chart for explaining treatment conditions for an object to be treated.

FIG. 11 is a chart for explaining treatment conditions for thermal decomposition. In the case of 600° C., the shredder dust rises in temperature from normal temperature to 600° C. in two hours, and cooled after being maintained at 600° C. for two hours and a half. In the case of 800° C., the shredder dust rises in temperature from normal temperature to 800° C. in two hours and a half, and cooled after being maintained at that temperature for two hours and a quarter.

In the case of cooling in the thermal decomposition under reduced pressure, substitution under reduced pressure of the present invention is applied, while in the case of cooling in the thermal decomposition under normal pressure, air cooling is performed without the present invention being applied. A thermally decomposed residue behind the thermal decomposition under normal pressure at 800° C. at which dioxins remain, is thermally decomposed further at 800° C. under reduced pressure, and the concentration of dioxins contained in the thermally decomposed residue is measured (the fraction of 800° C. thermal decomposition B in FIG. 12).

FIG. 12 shows the measurement results thereof. PCDDs and PCDFs are measured separately, and the sum of them is dioxin concentration (ng/g). Moreover, n.d. (not detected) in FIG. 12 shows that no dioxin is detected.

As shown above, dioxins in the heated residue can be extremely reduced according to the present invention. Especially in the thermal decomposition under normal pressure, dioxins remain even after treatment at 800° C., but dioxins can be removed if this residue is retreated under reduced pressure. Although the treatment example in which the shredder dust is used as an object to be treated is explained above, the same result can be obtained also in the case of soil, burned ashes, sludge, and the like. The present invention, as wastes treatment equipment, may be a manual system suitable for treatment in small quantities for general factories or a continuous treatment furnace suitable for treatment in bulk quantities for a self-governing body and the like, and combination is possible depending on treatment costs.

Embodiment 11

FIG. 13, FIG. 14, FIG. 15, and FIG. 16 are diagrams schematically showing other examples of the structure of the treatment apparatus of the present invention.

Figure 13:
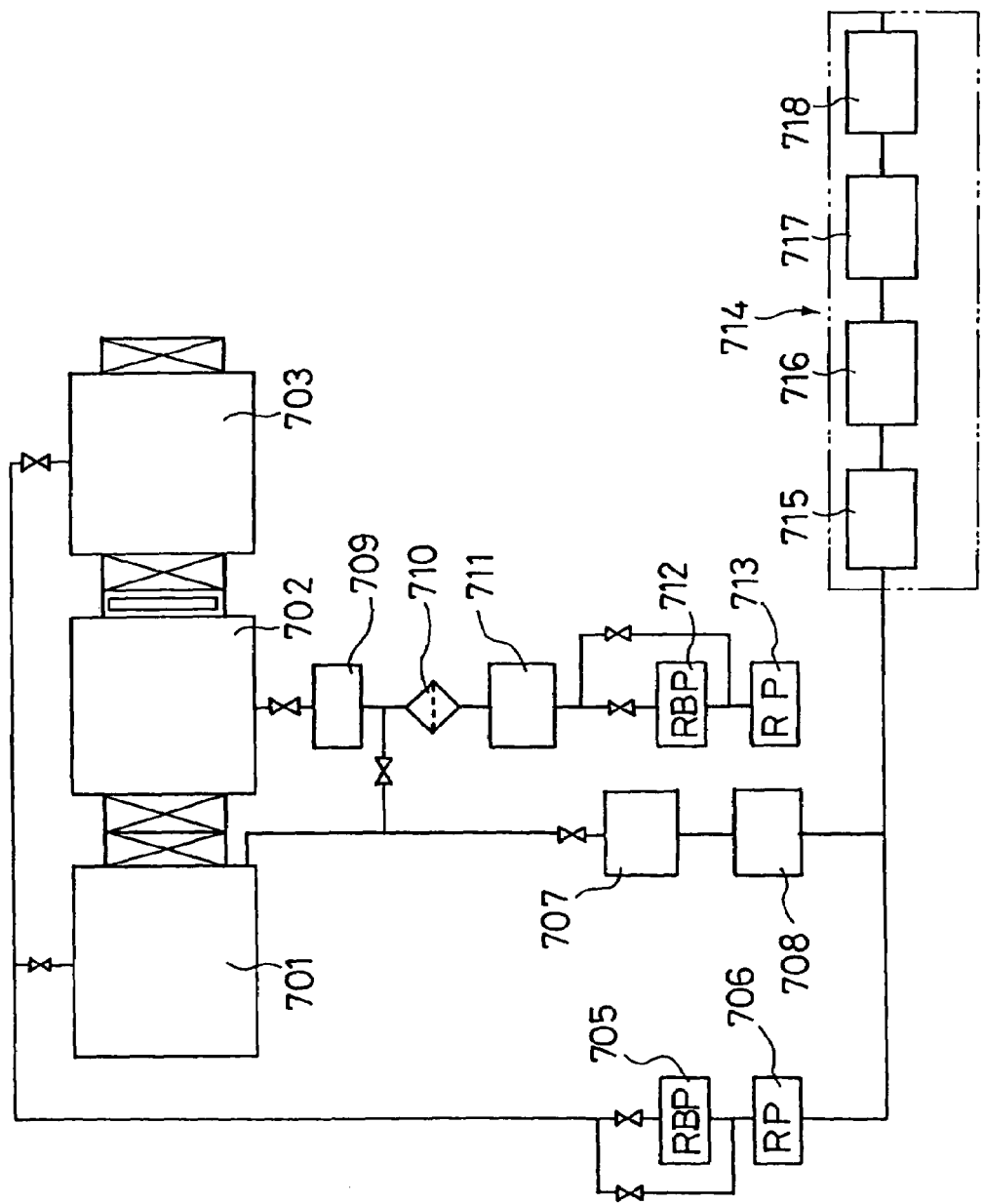
FIG. 13 is a diagram schematically showing an example of the structure of the treatment apparatus of the present invention.
Figure 14:
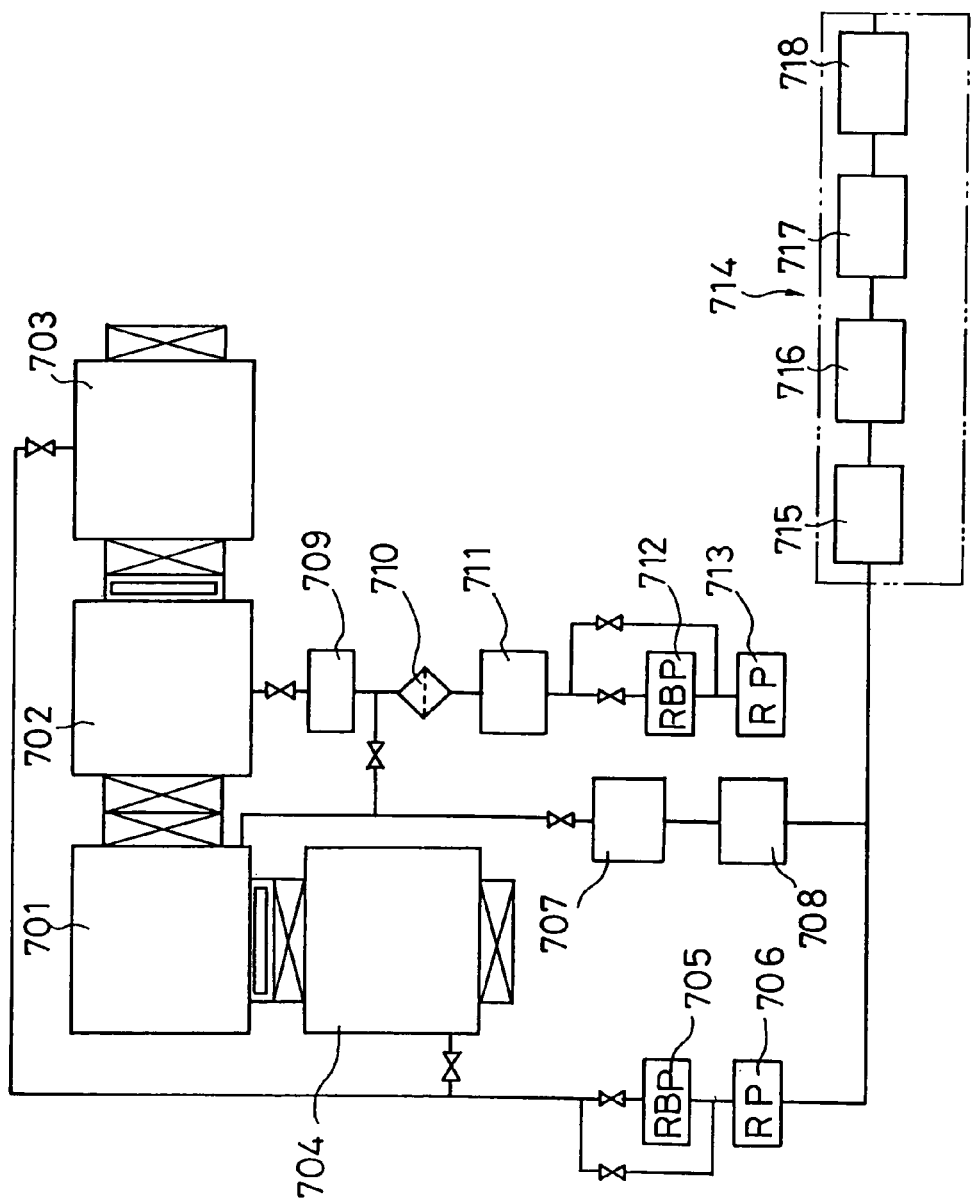
FIG. 14 is a diagram schematically showing an example of the structure of the treatment apparatus of the present invention.
Figure 15:
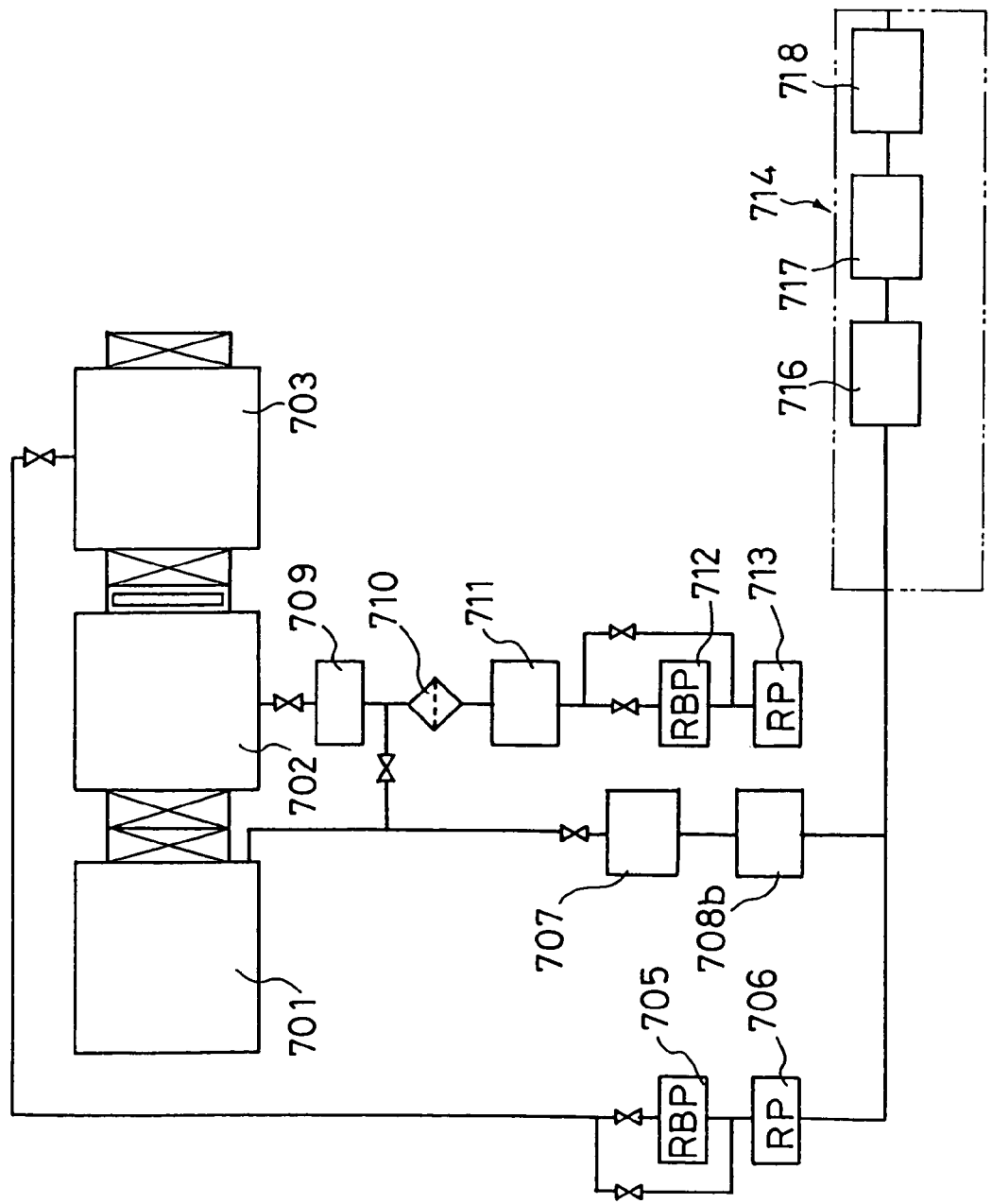
FIG. 15 is a diagram schematically showing an example of the structure of the treatment apparatus of the present invention.

In FIG. 13, FIG. 14. and FIG. 15, a dry distillation chamber 701 for thermal decomposition under normal pressure and an vacuum evaporation chamber 702 for thermal decomposition under reduced pressure are provided as heat treatment chambers. A cooling chamber 703 for cooling the heated residue is positioned at the next stage. These treatment chambers are divided by a vacuum door so as to be opened and closed.

In the structure illustrated in FIG. 13, FIG. 14, and FIG. 15, the object to be treated such as soil is introduced into the dry distillation heating chamber 701 and thermally decomposed, and then introduced into the vacuum evaporation chamber 702, where heavy metals such as arsenic, cadmium, lead, and the like are removed by evaporation. The heated residue of the object to be treated is introduced into the cooling chamber 703 and cooled by an atmosphere similar to that described above which is organic halide-free and has no organic halide generating capacity. The exhausting operation from within the system is performed by booster pumps 705 and 712 and rotary pumps 706 and 713. The structure in which the produced gases of the object to be treated are treated by a gas treatment device similarly to the above is given. The produced gases from the distillation heating chamber 701 are introduced into a gas treatment device 714 through a gas cracking device 707 and a condenser 708 for condensing and recovering evaporated substances in the produced gases. The produced gases from the vacuum heating chamber 702 are introduced into the gas treatment device 714 through a condenser 709 and an oil filter 711. The gas treatment device 714 includes a gas cracking device 715, a jet scrubber 716, an activated carbon filter, and an exhaust blower 718. In the example shown in FIG. 15, the gas cracking device 715 is omitted in the gas treatment device 714. Moreover, a gas combustion device for combusting the produced gases in place of the jet scrubber 716, and an alkali shower for alkali-cleaning the produced gases in place of the activated carbon filter 717 may be provided.

In FIG. 13 and FIG. 15, a loading chamber 704 for introducing the object to be treated into the dry distillation heating chamber 701 and the dry distillation heating chamber are common, but they may be provided separately. Furthermore, although FIG. 15 shows the structure in which an oil jet scrubber 708b is provided as a gas treatment device and oil in the produced gases is recovered there, the condenser 708 may be provided, instead.

Figure 16:
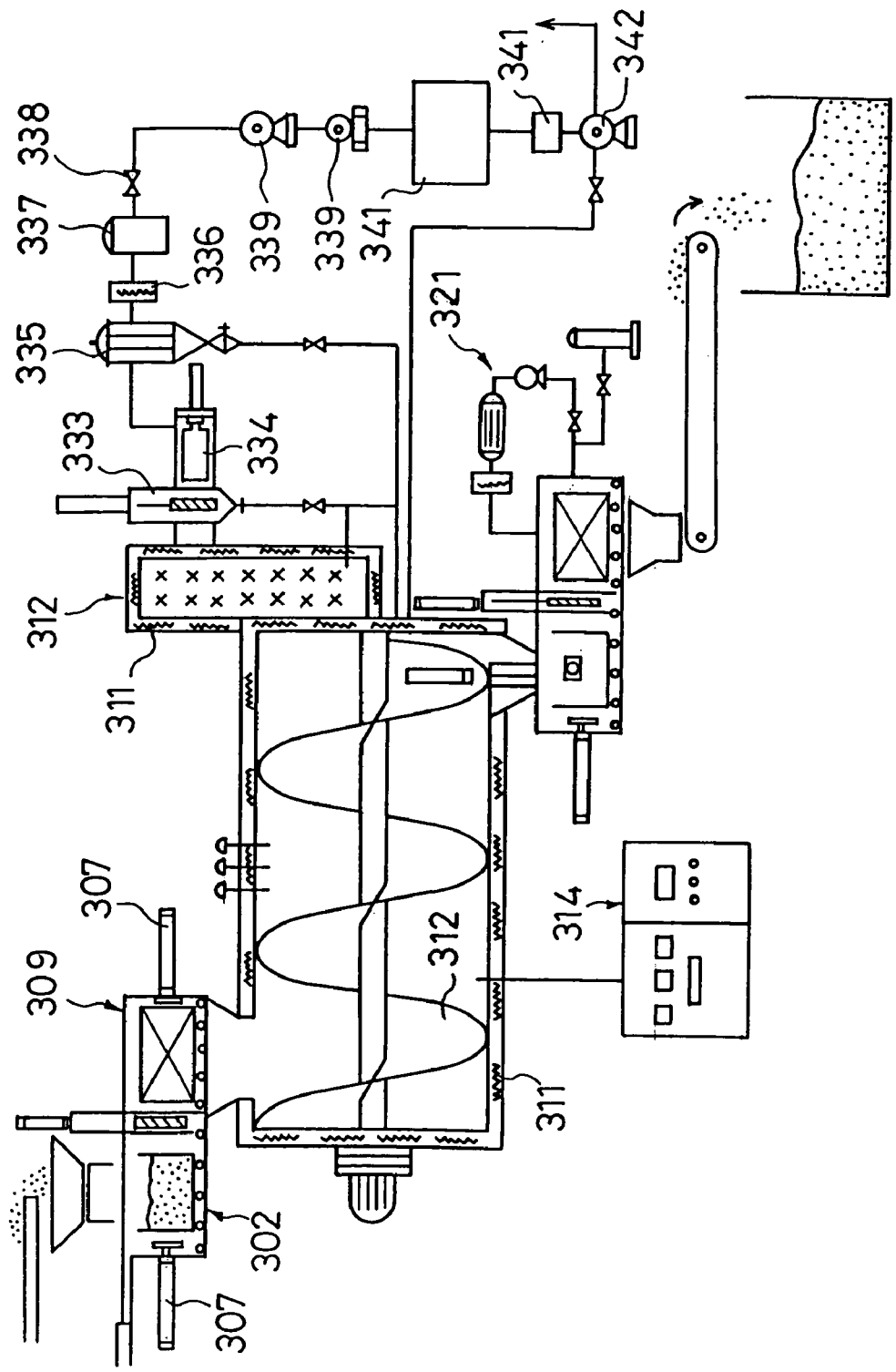
FIG. 16 is a diagram schematically showing an example of the structure of the treatment apparatus of the present invention.

FIG. 16 is a diagram schematically showing another example of the structure of the treatment apparatus of the present invention.

The example shown in FIG. 16 is an example of the treatment apparatus of the present invention which can be added to a refuse incinerator conventionally used by a local government and the like. Here, the structure in which the treatment of taking the heated residue out of the heating furnace is performed in the same manner as the throwing operation at the inlet side in FIG. 9 is illustrated. Such structure enables the concentration of the organic halides such as dioxins or the like contained in the burned residue of various wastes to be reduced.

Also in the treatment apparatus illustrated in FIG. 15 and FIG. 16, similarly to the aforethe treatment apparatus of the present invention, a plurality of cooling chambers may be provided in a row. Thereby, productivity can be improved even when treatment in each chamber needs a lot of time. Furthermore, treatment may be performed by introducing a plurality of trays into each chamber.

Embodiment 12

Figure 17:
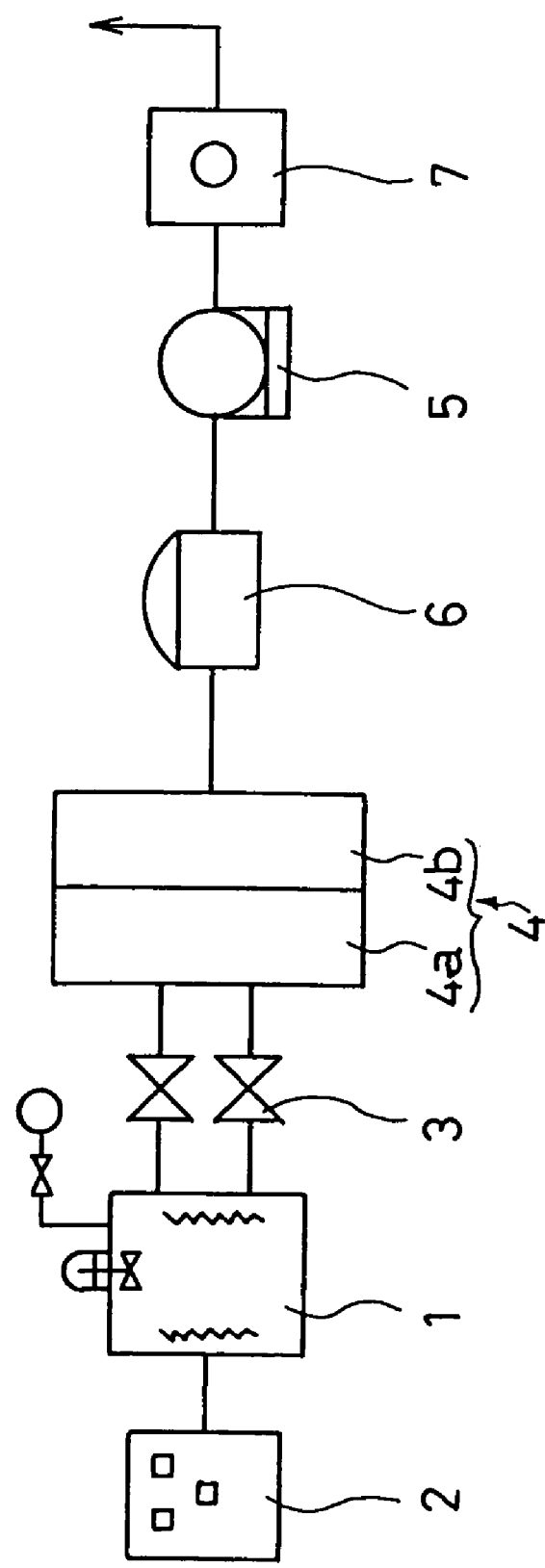
FIG. 17 is a diagram schematically showing an example of the structure of the treatment apparatus of the present invention.

FIG. 17 is a diagram showing an embodiment in single furnace structure of the present invention. A reduced pressure furnace 1 includes a control device 2 and a constant temperature halogen removing device 4 with vacuum doors 3 which are usually placed double between them. The reduced pressure furnace 1 is a roasting furnace (thermal decomposition furnace) including heating means the temperature of which is controlled by the control device 2, and performs roasting (thermal decomposition) treatment for the object to be treated such as a scrapped car or the like while the pressure therein is maintained at a predetermined degree of vacuum, being reduced from normal pressure by the operation of a vacuum pump 5 which is an exhaust system.

The constant temperature halogen removing device (constant temperature chloride removing device) 4 which is means for removing halogen such as chlorine or the like contained in the produced gases is a chamber into which an evaporation gas from the reduced pressure furnace 1 is introduced and of which the temperature is set at a predetermined value within the range of about 400° C. to about 1000° C. In this example, the constant temperature halogen removing device 4 is composed of two chambers, and metals such as iron, cutting scrap and/or compounds such as calcium hydroxide or the like which react with chlorine contained in the produced gases to compose a chloride are put into a first chamber 4a. A catalyst and the like for promoting fixing reaction of halogen in the produced gases and decomposition of organic halides in the produced gases are put thereinto.

A second chamber 4b is a chamber for adsorbing halogen which has passed through the first chamber 4a, and an adsorbent such as zeolite, for example, spherical zeolite, activated carbon, or the like is put thereinto. It is desirable that the interior of the constant temperature removing device 4 is maintained at the lowest possible temperature in order to raise the adsorptive effect and adsorptive efficiency of this adsorbent. The produced gases which have passed thorough the first chamber 4a are cooled in the second chamber 4b, and it is preferable that this cooling is performed rapidly so that the residence time of the produced gases in the temperature range in which organic halides such as dioxins are produced can be shortened as much as possible.

As described above, when the degree of vacuum in the reduced pressure furnace 1 does not reach a set value due to the trouble of equipment, structure of the object to be treated, and the like, the constant temperature halogen removing device 4 has functions of heating the produced gases containing the evaporation gas and dechlorinating dioxins and the like contained in the produced gases, and reacting chlorine with metal cutting scrap, calcium hydroxide, or the like to allow it to be fixed as a chloride, and moreover removing chlorine, which has not been reacted completely and intends to flow out, by adsorbing it by means of the adsorbent.

A condenser 6 for recovering and removing evaporated substances, which condenses metals, water, oil, oxides, and the like contained in the produced gases and recovers them, is provided between the constant temperature removing device 4 and the vacuum pump 5. The condenser 6 recovers metals, water, oil, oxides, and the like contained in the produced gases by condensing them. A plurality of systems of condensers 6 are sometimes provided as required.

Thereafter, the evaporation gas is sent to a removing device 7 which is a filter placed at a stage next to the vacuum pump 5 for removing SOx and the like in the produced gases, and exhausted to the outside of the system after NOx, chlorine, $NH_3$ (ammonia), and SOx are removed therefrom and the gas is made innoxious there. The removing device 7 includes, for example, honeycomb zeolite, activated carbon, and other adsorbents.

Embodiment 13

Figure 18:
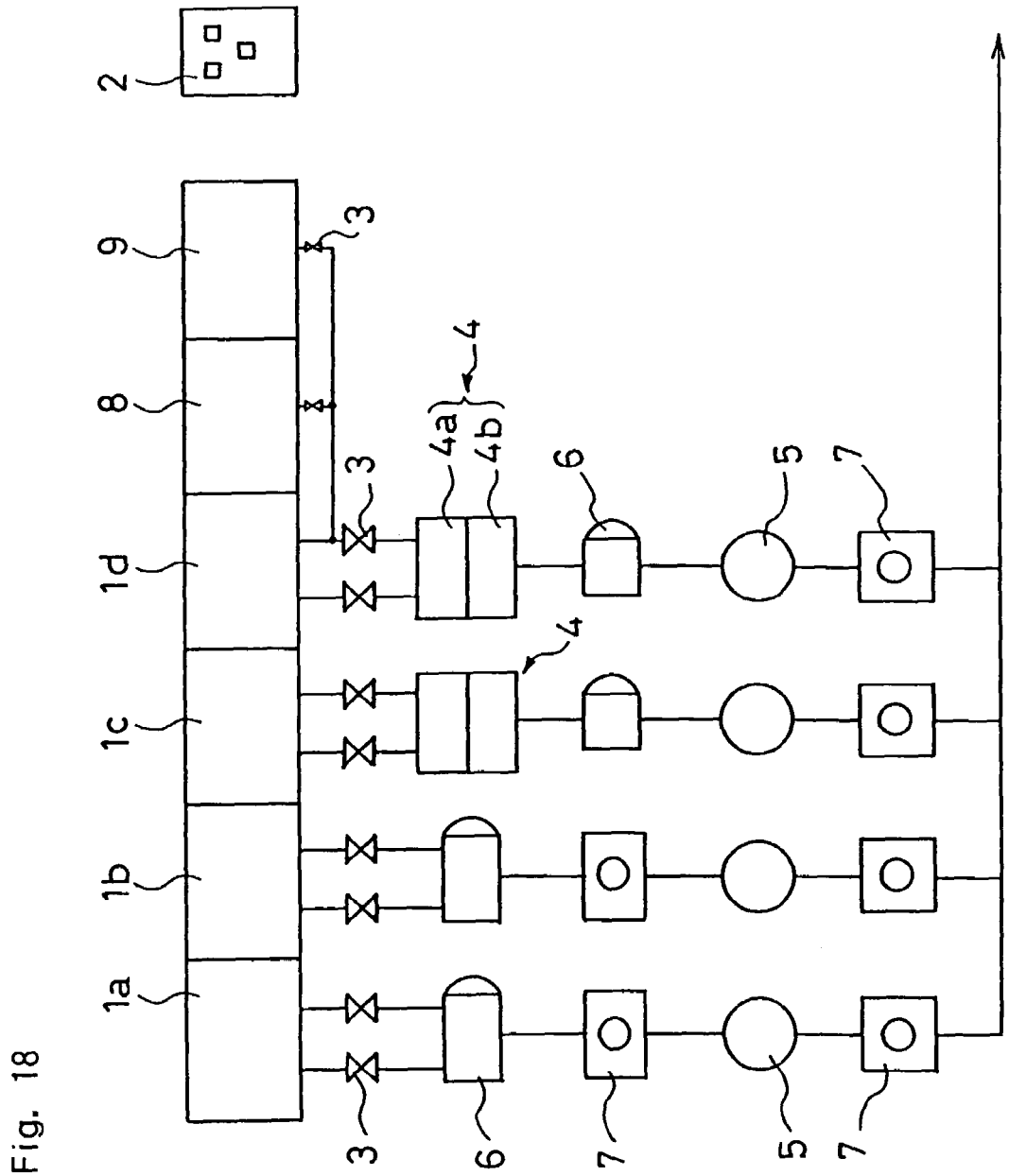
FIG. 18 is a diagram schematically showing an example of the structure of the treatment apparatus of the present invention.

FIG. 18 is a diagram showing an embodiment in continuous furnace structure of the present invention. A treatment apparatus illustrated in FIG. 18 basically has the structure in which the pressure reduced furnaces 1 illustrated in FIG. 17 are connected to each other to compose a continuous furnace. In this case, for example, in heating furnaces provided adjacent to one another, the thermal decomposition temperatures in respective furnaces are set to increase gradually.

In a first furnace 1a being a pre-heating chamber, for example, mainly water and oil are evaporated from the object to be treated by heating the object to be treated such as soil, sludge, agricultural products, aquatic products, plastics, fibers, rubbers, metals, metallic oxides, or the like in the range of about 0° C. to 100° C. In a second furnace 1b being a substitution chamber for purging an non-oxidizing atmosphere for an atmosphere in the furnace, mainly residual oil and halogen such as chlorine or the like are evaporated from the object to be treated by maintaining the degree of vacuum in the furnace at about 1 Torr to 500 Torr and performing heating in the range of about 100° C. to 160° C. Dioxins are not generated under the temperature condition not more than about 180° C., and hence to reduce the quantity of organic halides, it is preferable to evaporate evaporable organic components such as water and oil, and halogen such as chlorine as much as possible at this stage. No burden is imposed on pressure control in reduced pressure furnaces at the subsequent stages by such structure. Furthermore, a possibility of generating noxious organic halides such as dioxins can be reduced.

Dioxins are not generated in the first furnace 1a and the second furnace 1b which are maintained at relatively low temperatures, and thus the provision of a halogen trap such as the aforethe constant temperature halogen removing device 4 can be omitted in an evaporated substance (including produced gases) treatment system connected to the above furnaces.

In a third furnace 1c, the degree of vacuum is maintained at about $10^{-1}$ Torr to about $10^{-4}$ Torr, and heating is performed in the range of about 180° C. to 400° C. to thermally decompose the object to be treated such as soil, sludge, agricultural products, aquatic products, plastics, fibers, rubbers, metals, metallic oxides, or the like. In a fourth furnace 1d, the degree of vacuum is maintained at about $10^{-2}$ Torr to about $10^{-6}$ Torr, and the object to be treated is heated in the range of about 400° C. to about 1400° C. The ends of evaporated substance treatment lines provided respectively in the aforethe furnaces 1a to 1d extend to the outside of the apparatus individually or after more than one end being united, and the evaporation gas which is made pollution-free is exhausted therefrom to the outside of the system.

A cooling precipitation chamber 8 is provided adjacent to the final-stage fourth furnace 1d. In this cooling condensation chamber 8, under reduced pressure, the temperature is maintained at a low temperature in the range of 50° C. to 200° C. by a heat exchanger such as a water cooled tube or the like, the evaporated substances from the object to be treated are condensed by cooling the evaporation gas which flows in from the fourth furnace 1d, and a vacuum packing at the inlet of a cooling and air substitution chamber 9 is protected.

The air substitution chamber 9 is placed adjacent to the cooling condensation chamber 8. Similarly to the cooling condensation chamber 8, nitrogen gas is supplied under normal pressure to cool the temperature in the chamber to a low temperature in the range of about 50° C. to 150° C. by a heat exchanger such as a water cooled tube or the like. After the object to be treated is fully cooled in the chamber, the treated object is taken out of the air substitution chamber 9.

The aforethe treatment method and treatment apparatus can be applied, for example, to treatment of an object to be treated containing organic halides such as dioxins let out from refuse disposal facilities of a local government, factories, and the like, such as a heated residue, burned fly ashes, residual ashes or residual liquid, and an object to be treated such as soil containing organic halides such as dioxins falling from chimneys and the like of refuse disposal facilities, waste disposal facilities, and factories.

In the present invention, as described above, thermal decomposition treatment of scrapped cars and the like is performed while both the treatment pressure and temperature in the heating chamber are being changed, and water, oil, chlorine, and the like can be evaporated at the initial treatment stage at which dioxins are not generated. Consequently, the amount of generation of evaporation gas at the following treatment stages can be held down, which facilitates pressure control. A rise in temperature in the chamber is performed stepwise, and thus not performed excessively. Accordingly, thermal decomposition of scrapped cars and the like can be performed smoothly.

In addition to this, the method and treatment apparatus according to the present invention can be also applied, for example, to dioxins contained in a heated residue, burned fly ashes, residual ashes, or residual liquid let out from refuse disposal facilities of a self-governing body, factories, and the like.

Furthermore, according to the present invention, even when the degree of vacuum in the reduced pressure furnace dose not reach a predetermined degree of vacuum due to trouble of equipment, dechlorination of evaporation gas is thoroughly attained, which makes it possible to prevent dioxins from being generated.

INDUSTRIAL AVAILABILITY

The present invention is as described above, and the control of the quantities of reactive chlorine atoms and oxygen is effective in supressing the generation of dioxins. In this respect, chlorine and oxygen are removed by introducing decomposition gas produced by thermal decomposition into a reducing retort, the concentrations of oxygen and chlorine contained in gas let out from the reducing retort are analyzed, and based on this analysis, a reducing agent is thrown into a furnace and both temperature control and pressure control are performed. This has the effect of supressing the generation of dioxins on the occasion of thermal decomposition and certainly performing the decomposition and removal of generated dioxins or dioxins remaining in residual ashes, soil, and the like.

In the present invention, the performance of thermal decomposition under reduced pressure enables more efficient inhibition of generation of dioxins and decomposition treatment thereof, and in this case, the use of a water sealing pump as a vacuum pump has the effect of enabling thermal decomposition treatment of domestic refuse, shredder dust, or the like which produces a lot of moisture.

Furthermore, when gases produced by thermal decomposition are treated through the steps of: recovering evaporated metals by condensation; removing fine particles by an oil film; producing salt by contact with an alkali solution; and removing salt by an ion-exchange resin membrane, the removal of dioxins becomes more certain.

The present invention allows a heated residue to contain no organic halide such as dioxins or the like by cooling the heated residue of the object to be treated after removing gas containing an organic halide such as dioxins or the like therefrom.

The addition of the treatment apparatus of the present invention behind a conventional combustion furnace or roasting furnace for waste disposal makes it possible to effectively reduce dioxins and the like in the heated residue.

Moreover, also in the case of soil and a heated residue such as burned ashes which contain dioxins, and sludge, water, oil, and the like flowing out from these soil and heated residue, residual dioxins can be removed therefrom by adopting the aforethe invention.

Furthermore, in the present invention, noxious substances contained in not only the heated residue but also produced gases from the object to be treated can be reduced. Besides, by taking measures against the noxious substances multifold in a produced gas treatment system, treatment can be performed more safely and certainly.

In addition, a method different from the gas substitution method, in which the heated residue is cooled after a reducing substance is thrown into the furnace, which is being heated, to reduce and remove dioxins in the produced gases is realized, and the methods may be used in combination as required.

The invention claimed is:

1. A soil producing method for producing second soil containing organic halides with a second concentration lower than a first concentration from first soil containing the organic halides with the first concentration, comprising the steps of:
   introducing the first soil to a hermetic zone;
   pumping out the hermetic zone to a vacuum state using at least a vacuum pump;
   thermally decomposing at least a part of the organic halides by heating the first soil in the hermetic zone under the vacuum state; and
   heating, at an exhaust portion of the hermetic zone also under the vacuum state, a gaseous substance produced by the thermal decomposition of the organic halides.

2. The soil producing method as set forth in claim 1, wherein the organic halides are dioxins.

3. The soil producing method as set forth in claim 1, further comprising the step of:
   reducing the concentration of halogen contained in gases produced by the thermal decomposition of the soil.

4. The soil producing method as set forth in claim 1, wherein a thermally decomposed residue of the first soil is cooled after the hermetic zone is purged by a purge gas which is substantially organic halide-free and not capable of generating organic halides.

5. The soil producing method as set forth in claim 4, wherein the purge gas contains at least one element selected from a group consisting of helium, neon, argon, krypton, xenon, nitrogen, and hydrogen.

6. The soil producing method as set forth in claim 1, wherein the thermally decomposing step is performed in the hermetic zone where an oxygen concentration is controlled.

7. A soil producing method, comprising:
   thermally decomposing soil containing organic halides under a vacuum state formed using at least a vacuum pump; and
   heating, at an exhaust portion of a hermetic zone under the vacuum state, a gaseous substance produced by the thermal decomposition.

8. The soil producing method as set forth in claim 7, wherein the concentration of halogen contained in gases produced by the thermal decomposition of soil is reduced.

9. A treatment method, comprising:
   thermally decomposing an object to be treated containing organic halides under a vacuum state formed using at least a vacuum pump; and
   heating, at an exhaust portion of a hermetic zone under the vacuum state, a gaseous substance produced by the thermal decomposition.

10. A treatment method, comprising:
    passing an object to be treated through a furnace allowing the control of thermal decomposition temperature or through a plurality of reduced pressure furnaces different in thermal decomposition temperature when being subjected to thermal decomposition treatment under a vacuum state formed using at least a vacuum pump; and
    heating, at an exhaust portion of the furnace or one of the plurality of the reduced pressure furnaces under the vacuum state, a gaseous substance produced by the thermal decomposition.

11. A treatment method,
    providing a furnace allowing the control of thermal decomposition temperature at which an object to be treated is subjected to thermal decomposition treatment;
    changing the pressure in the furnace from normal pressure to a vacuum state formed using at least a vacuum pump; and
    heating, at an exhaust portion of the furnace under the vacuum state, a gaseous substance produced by the thermal decomposition treatment.

12. A treatment apparatus, wherein a normal pressure furnace and a plurality of reduced pressure furnaces each for subjecting an object to be treated to thermal decomposition treatment are continuously provided, and the thermal decomposition temperature in each of the furnaces is set so as to increase with progress to a later stage.

13. The treatment apparatus as set forth in claim 12, further comprising:
    halogen trapping means placed to connect with the reduced pressure furnaces and holding metal for forming compounds with halogen contained in gases produced by the thermal decomposition of the object to be treated or an adsorbent for adsorbing the halogen in the produced gases therein.

14. A treatment method, comprising:
    treating a residue containing residual dioxins generated from waste disposal facilities and factories while heating the residue in a hermetic zone under a vacuum state formed using at least a vacuum pump; and
    heating, at an exhaust portion of the hermetic zone under the vacuum state, a gaseous substance produced by the treatment of the heated residue is heated under the vacuum state.

* * * * *